United States Patent

[11] 3,634,827

[72] Inventors Janice Richmond Lourie;
Lin S. Woo, both of New York, N.Y.
[21] Appl. No. 29,228
[22] Filed Apr. 16, 1970
[45] Patented Jan. 11, 1972
[73] Assignee International Business Machines Corporation
Armonk, N.Y.

[54] PROCESSING OF MULTILAYER WEAVE DESIGN DATA
10 Claims, 33 Drawing Figs.

[52] U.S. Cl. .......... 340/172.5, 444/1
[51] Int. Cl. .......... G06f 9/06, D03d 49/00
[50] Field of Search .......... 340/172.5; 139/317, 318, 319; 112/78, 79

[56] References Cited

UNITED STATES PATENTS

| | | | |
|---|---|---|---|
| 3,129,411 | 4/1964 | Albrecht | 340/172.5 X |
| 3,247,815 | 4/1966 | Polevitzky | 112/79 |
| 3,425,038 | 1/1969 | Trousdale | 340/172.5 |
| 3,529,298 | 9/1970 | Lourie | 350/172.5 |

*Primary Examiner*—Paul J. Henon
*Assistant Examiner*—Paul R. Woods
*Attorneys*—Hanifin and Jancin and Charles P. Boberg

ABSTRACT: Technique for developing a multilayer weave design matrix from individual weave pattern matrices for the respective layers, the final matrix being in the form of binary operating instructions to a loom for actuating the warp threads in such a way as to provide the desired multilayer weave design. The individual layer matrices first are assembled into a block diagonal form of matrix in which these layer matrices are arranged as nonoverlapping, diagonally adjacent blocks, on one side of which (e.g., lower side) the large matrix is filled with bits of one value (e.g., 1's), while on the other side of the diagonal blocks (e.g., upper side) the large matrix is filled with bits of the opposite value (e.g., 0's). Row and column interleaving operations then are performed so that in the final matrix the rows and columns of each layer matrix are interspersed as evenly as possible with those of the other matrices. If interconnections between layers are desired, these are specified in the large matrix before its transformation, merely by changing the value of the 1 or 0 bit whose coordinates are the particular row of one layer and the particular column of the other layer which are to be interconnected or interlaced.

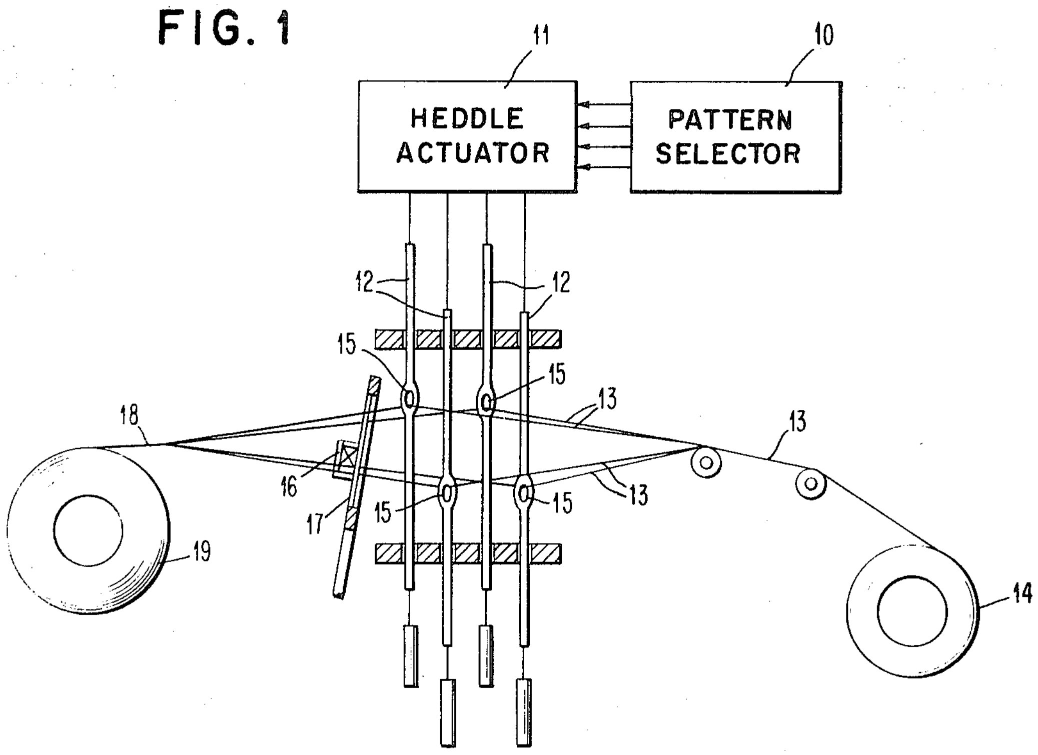
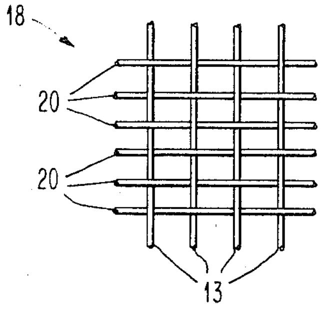
FIG. 2
FIG. 3
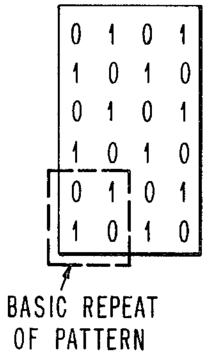
INVENTORS
JANICE RICHMOND LOURIE
LIN S. WOO
BY Charles P. Boberg
ATTORNEY

FIG. 10

W1

LAYER MATRIX
1ST LAYER
ROW SIZE = 5
COLUMN SIZE = 7

| ROW NO. \ COLUMN NO. | 1 | 2 | 3 | 4 | 5 | 6 | 7 |
|---|---|---|---|---|---|---|---|
| 1 | 0 | 0 | 0 | 1 | 1 | 1 | 0 |
| 2 | 1 | 1 | 0 | 0 | 0 | 1 | 1 |
| 3 | 0 | 1 | 1 | 1 | 0 | 0 | 0 |
| 4 | 1 | 0 | 0 | 0 | 1 | 1 | 1 |
| 5 | 1 | 1 | 1 | 0 | 0 | 0 | 1 |

FIG. 11

W2

LAYER MATRIX
2ND LAYER
ROW SIZE = 4
COLUMN SIZE = 3

| ROW NO. \ COLUMN NO. | 1 | 2 | 3 |
|---|---|---|---|
| 1 | 1 | 1 | 0 |
| 2 | 1 | 0 | 0 |
| 3 | 0 | 1 | 1 |
| 4 | 0 | 0 | 1 |

FIG. 12

W3

LAYER MATRIX
3RD LAYER
ROW SIZE = 2
COLUMN SIZE = 4

| ROW NO. \ COLUMN NO. | 1 | 2 | 3 | 4 |
|---|---|---|---|---|
| 1 | 1 | 1 | 0 | 0 |
| 2 | 0 | 0 | 1 | 1 |

FIG. 13

DIAGONAL MATRIX Z
(BEFORE TRANSFORMATION)

| ROW NO. \ COLUMN NO. | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| 1 | 0 | 0 | 0 | 1 | 1 | 1 | 0 | 0 | 0 | 0 | 0 | 0 | 0 | 0 |
| 2 | 1 | 1 | 0 | 0 | 0 | 1 | 1 | 0 | 0 | 0 | 0 | 0 | 0 | 0 |
| 3 | 0 | 1 | 1 | 1 | 0 | 0 | 0 | 0 | 0 | 0 | 0 | 0 | 0 | 0 |
| 4 | 1 | 0 | 0 | 0 | 1 | 1 | 1 | 0 | 0 | 0 | 0 | 0 | 0 | 0 |
| 5 | 1 | 1 | 1 | 0 | 0 | 0 | 1 | 0 | 0 | 0 | 0 | 0 | 0 | 0 |
| 6 | 1 | 1 | 1 | 1 | 1 | 1 | 1 | 1 | 1 | 0 | 0 | 0 | 0 | 0 |
| 7 | 1 | 1 | 1 | 1 | 1 | 1 | 1 | 1 | 0 | 0 | 0 | 0 | 0 | 0 |
| 8 | 1 | 1 | 1 | 1 | 1 | 1 | 1 | 0 | 1 | 1 | 0 | 0 | 0 | 0 |
| 9 | 1 | 1 | 1 | 1 | 1 | 1 | 1 | 0 | 0 | 1 | 0 | 0 | 0 | 0 |
| 10 | 1 | 1 | 1 | 1 | 1 | 1 | 1 | 1 | 1 | 1 | 1 | 1 | 0 | 0 |
| 11 | 1 | 1 | 1 | 1 | 1 | 1 | 1 | 1 | 1 | 1 | 0 | 0 | 1 | 1 |

W1 (rows 1–5, columns 1–7); W2 (rows 6–9, columns 8–10); W3 (rows 10–11, columns 11–14); Z (whole matrix)

FIG. 14

Z'

| OLD ROW NOS. | NEW ROW NOS. \ COLUMN NOS. | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| 1 | 1 | 0 | 0 | 0 | 1 | 1 | 1 | 0 | 0 | 0 | 0 | 0 | 0 | 0 | 0 |
| 2 | 2 | 1 | 1 | 0 | 0 | 0 | 1 | 1 | 0 | 0 | 0 | 0 | 0 | 0 | 0 |
| 3 | 3 | 0 | 1 | 1 | 1 | 0 | 0 | 0 | 0 | 0 | 0 | 0 | 0 | 0 | 0 |
| 6 | 4 | 1 | 1 | 1 | 1 | 1 | 1 | 1 | 1 | 1 | 0 | 0 | 0 | 0 | 0 |
| 7 | 5 | 1 | 1 | 1 | 1 | 1 | 1 | 1 | 1 | 0 | 0 | 0 | 0 | 0 | 0 |
| 10 | 6 | 1 | 1 | 1 | 1 | 1 | 1 | 1 | 1 | 1 | 1 | 1 | 1 | 0 | 0 |
| 4 | 7 | 1 | 0 | 0 | 0 | 1 | 1 | 1 | 0 | 0 | 0 | 0 | 0 | 0 | 0 |
| 5 | 8 | 1 | 1 | 1 | 0 | 0 | 0 | 1 | 0 | 0 | 0 | 0 | 0 | 0 | 0 |
| 8 | 9 | 1 | 1 | 1 | 1 | 1 | 1 | 1 | 0 | 1 | 1 | 0 | 0 | 0 | 0 |
| 9 | 10 | 1 | 1 | 1 | 1 | 1 | 1 | 1 | 0 | 0 | 1 | 0 | 0 | 0 | 0 |
| 11 | 11 | 1 | 1 | 1 | 1 | 1 | 1 | 1 | 1 | 1 | 1 | 0 | 0 | 1 | 1 |

INTERMEDIATE MATRIX Z' FORMED BY ROW INTERLEAVING

FIG. 15

Z"

| OLD COLUMN NOS. → | 1 | 2 | 3 | 8 | 11 | 12 | 4 | 5 | 9 | 13 | 6 | 7 | 10 | 14 |
|---|---|---|---|---|---|---|---|---|---|---|---|---|---|---|
| **NEW COLUMN NOS. → / ROW NOS.** | **1** | **2** | **3** | **4** | **5** | **6** | **7** | **8** | **9** | **10** | **11** | **12** | **13** | **14** |
| 1 | 0 | 0 | 0 | 0 | 0 | 0 | 1 | 1 | 0 | 0 | 1 | 0 | 0 | 0 |
| 2 | 1 | 1 | 0 | 0 | 0 | 0 | 0 | 0 | 0 | 0 | 1 | 1 | 0 | 0 |
| 3 | 0 | 1 | 1 | 0 | 0 | 0 | 1 | 0 | 0 | 0 | 0 | 0 | 0 | 0 |
| 4 | 1 | 1 | 1 | 1 | 0 | 0 | 1 | 1 | 1 | 0 | 1 | 1 | 0 | 0 |
| 5 | 1 | 1 | 1 | 1 | 0 | 0 | 1 | 1 | 0 | 0 | 1 | 1 | 0 | 0 |
| 6 | 1 | 1 | 1 | 1 | 1 | 1 | 1 | 1 | 1 | 0 | 1 | 1 | 1 | 0 |
| 7 | 1 | 0 | 0 | 0 | 0 | 0 | 0 | 1 | 0 | 0 | 1 | 1 | 0 | 0 |
| 8 | 1 | 1 | 1 | 0 | 0 | 0 | 0 | 0 | 0 | 0 | 0 | 1 | 0 | 0 |
| 9 | 1 | 1 | 1 | 0 | 0 | 0 | 1 | 1 | 1 | 0 | 1 | 1 | 1 | 0 |
| 10 | 1 | 1 | 1 | 0 | 0 | 0 | 1 | 1 | 1 | 0 | 1 | 1 | 1 | 0 |
| 11 | 1 | 1 | 1 | 1 | 0 | 0 | 1 | 1 | 1 | 1 | 1 | 1 | 1 | 1 |

FINAL MULTILAYER WEAVE MATRIX Z"
(AFTER COLUMN INTERLEAVING)

FIG. 16A

LEGEND

K = NUMBER OF LAYERS
XY = LIST OF SUCCESSIVE ROWS OF 1ST LAYER MATRIX FOLLOWED BY SUCCESSIVE ROWS OF 2ND LAYER MATRIX, ETC., THROUGH THE K'TH LAYER, ALL ARRANGED IN VECTOR FORMAT
M = VECTOR WHOSE COMPONENTS ARE THE ROW SIZES OF THE RESPECTIVE LAYER MATRICES
N = VECTOR WHOSE COMPONENTS ARE THE COLUMN SIZES OF THE RESPECTIVE LAYER MATRICES
L = CURRENT LAYER NUMBER
H = 2-COMPONENT VECTOR WHOSE 1ST COMPONENT IS THE SPECIFIED ROW SIZE AND WHOSE 2ND COMPONENT IS THE SPECIFIED COLUMN SIZE
J = CURRENT ROW NUMBER IN LAYER MATRIX
X = AN ARRAY HAVING THE NUMBER OF ELEMENTS SPECIFIED BY H
MS = TOTAL NUMBER OF ROWS IN ALL LAYER MATRICES
NS = TOTAL NUMBER OF COLUMNS IN ALL LAYER MATRICES
MY = VECTOR HAVING COMPONENTS MS AND NS
Z = MULTILAYER DIAGONAL MATRIX, BEFORE TRANSFORMATION
MR = LENGTH OF 1'S STRING INSERTED INTO CURRENT ROW OF Z
P = CURRENT ROW NUMBER IN Z
ROT = LENGTH OF STRING OF BITS FROM CURRENT LAYER MATRIX INSERTED INTO CURRENT ROW OF Z
VM = ROW INTERLEAVING VECTOR
VN = COLUMN INTERLEAVING VECTOR
Z' = MATRIX FORMED BY APPLYING ROW INTERLEAVING PROCESS TO Z
Z" = FINAL MULTILAYER WEAVE MATRIX FORMED BY APPLYING COLUMN INTERLEAVING PROCESS TO Z'

FIG. 16

"DEV" ROUTINE FOR DEVELOPING MULTILAYER WEAVE MATRIX FROM WEAVE MATRICES OF INDIVIDUAL LAYERS

| |
|---|
| FIG. 16A |
| FIG. 16B |
| FIG. 16C |
| FIG. 16D |
| FIG. 16E |
| FIG. 16F |

OPERATOR CALLS "DEV" AND SPECIFIES NUMBER OF LAYERS (K) E.G., DEV 3

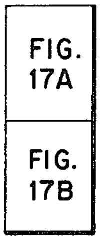

FIG. 17

"INT" SUBROUTINE FOR DEVELOPING THE ROW & COLUMN INTERLEAVING VECTORS (SHOWN HEREIN WITH SPECIFIC REFERENCE TO ROW INTERLEAVING PROCESS, STEP D37 OF "DEV" ROUTINE, FIG. 16F)

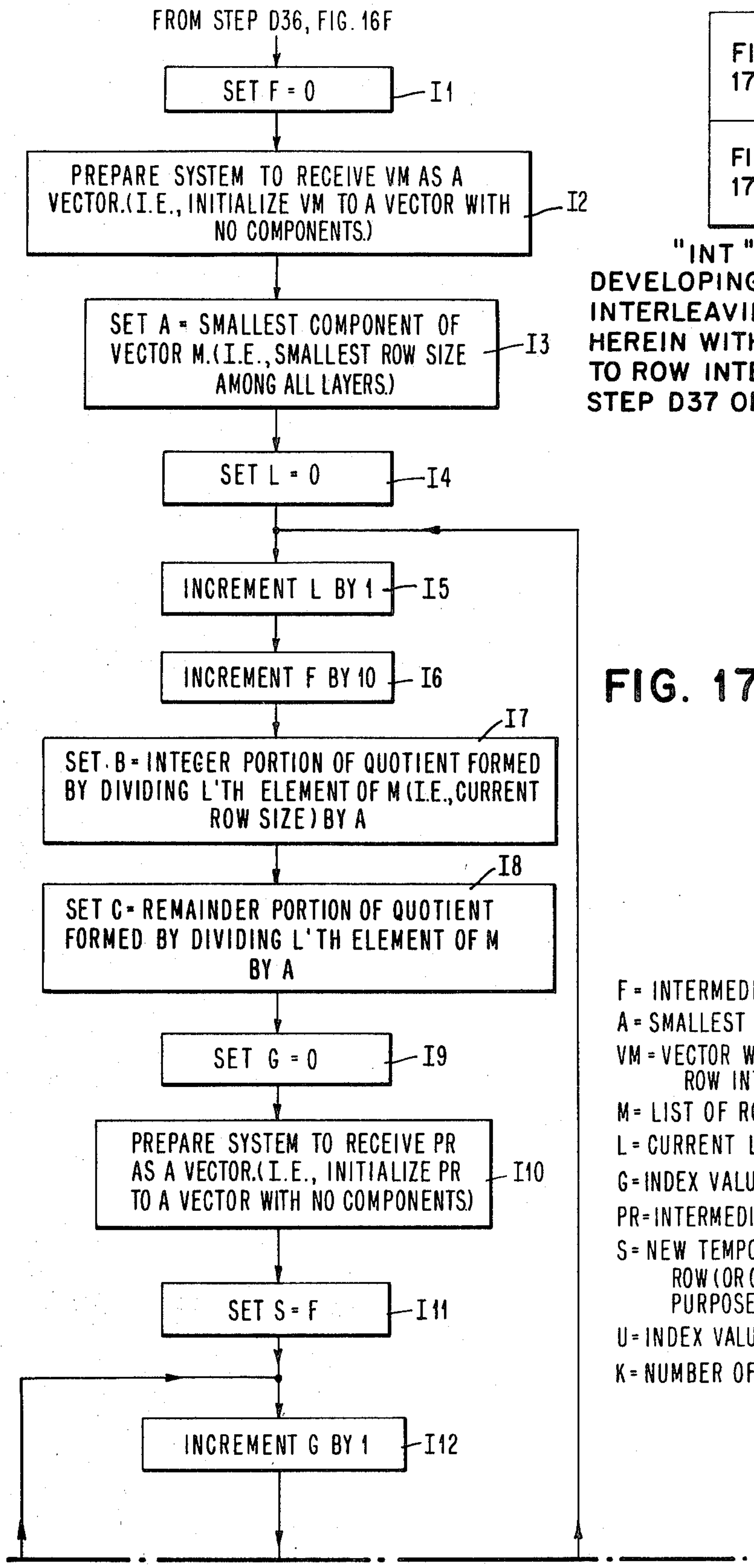

FIG. 17A

<u>LEGEND</u>

F = INTERMEDIATE VALUE, SCALAR
A = SMALLEST ROW SIZE (OR COLUMN SIZE)
VM = VECTOR WHOSE FINAL VALUE WILL BE THE ROW INTERLEAVING VECTOR
M = LIST OF ROW SIZES
L = CURRENT LAYER NUMBER
G = INDEX VALUE WHICH GOES FROM 0 TO A
PR = INTERMEDIATE VALUE VECTOR
S = NEW TEMPORARY NUMBER ASSIGNED TO ROW (OR COLUMN) FOR RE-ORDERING PURPOSES
U = INDEX VALUE WHICH GOES FROM 0 TO B
K = NUMBER OF LAYERS

FIG. 18

FORMATION OF ROW INTERLEAVING VECTOR VM (STEP D37, FIG. 16F)

| NAME AND/OR SYMBOL | SMALLEST ROW SIZE (A) = 2 | | | | | | | | | | |
|---|---|---|---|---|---|---|---|---|---|---|---|
| LAYER NUMBER L | 1 | | | | | 2 | | | | 3 | |
| ROW SIZE M[L] | 5 | | | | | 4 | | | | 2 | |
| B | 2 | | | | | 2 | | | | 1 | |
| C | 1 | | | 0 | | 0 | | | | 0 | |
| G | 1 | 1 | 1 | 2 | 2 | 1 | 1 | 2 | 2 | 1 | 2 |
| U | 1 | 2 | 2 | 1 | 2 | 1 | 2 | 1 | 2 | 1 | 2 |
| F | 10 | 10 | 10 | 10 | 10 | 20 | 20 | 20 | 20 | 30 | 30 |
| S | 10 | 10 | 10 | 110 | 110 | 20 | 20 | 120 | 120 | 30 | 130 |
| VECTOR PR | 10, | 10, | 10, | 110, | 110 | 20, | 20, | 120, | 120 | 30, | 130 |
| INITIAL VECTOR VM | 10, | 10, | 10, | 110, | 110, | 20, | 20, | 120, | 120, | 30, | 130 |
| ELEMENTS OF VM IN ASCENDING ORDER | 10 | 10 | 10 | 20 | 20 | 30 | 110 | 110 | 120 | 120 | 130 |
| FINAL VECTOR VM (PERMUTATION OF VM WHICH GRADES ITS ELEMENTS UP) | 1 | 2 | 3 | 6 | 7 | 10 | 4 | 5 | 8 | 9 | 11 |
| FINAL ROW NUMBERS | 1 | 2 | 3 | 4 | 5 | 6 | 7 | 8 | 9 | 10 | 11 |

FIG. 19

FORMATION OF COLUMN INTERLEAVING VECTOR VN (STEP D38, FIG. 16F)

SMALLEST COLUMN SIZE (A) = 3

| NAME AND/OR SYMBOL | | | | | | | | | | | | | | |
|---|---|---|---|---|---|---|---|---|---|---|---|---|---|---|
| LAYER NUMBER L | 1 | | | | | | | 2 | | | 3 | | | |
| COLUMN SIZE N[L] | 7 | | | | | | | 3 | | | 4 | | | |
| B | 2 | | | | | | | 1 | | | 1 | | | |
| C | 1 | | | 0 | | | | 0 | | | 1 | | 0 | |
| G | 1 | 1 | 1 | 2 | 2 | 3 | 3 | 1 | 2 | 3 | 1 | 1 | 2 | 3 |
| U | 1 | 2 | 2 | 1 | 2 | 1 | 2 | 1 | 1 | 1 | 1 | 1 | 1 | 1 |
| F | 10 | 10 | 10 | 10 | 10 | 10 | 10 | 20 | 20 | 20 | 30 | 30 | 30 | 30 |
| S | 10 | 10 | 10 | 110 | 110 | 210 | 210 | 20 | 120 | 220 | 30 | 30 | 130 | 230 |
| VECTOR PR | 10, | 10, | 10, | 110, | 110, | 210, | 210, | 20, | 120, | 220, | 30, | 30, | 130, | 230 |
| INITIAL VECTOR VN | 10, | 10, | 10, | 110, | 110, | 210, | 210, | 20, | 120, | 220, | 30, | 30, | 130, | 230 |
| ELEMENTS OF VN IN ASCENDING ORDER | 10 | 10 | 10 | 20 | 30 | 30 | 110 | 110 | 120 | 130 | 210 | 210 | 220 | 230 |
| FINAL VECTOR VN (PERMUTATION OF VN WHICH GRADES ITS ELEMENTS UP) | 1 | 2 | 3 | 8 | 11 | 12 | 4 | 5 | 9 | 1.3 | 6 | 7 | 10 | 14 |
| FINAL COLUMN NUMBERS | 1 | 2 | 3 | 4 | 5 | 6 | 7 | 8 | 9 | 10 | 11 | 12 | 13 | 14 |

"CON" SUBROUTINE FOR INTERCONNECTING LAYERS AT DESIGNATED POINTS (THIS SUBROUTINE IS INSERTED BETWEEN STEPS D36 AND D37 OF "DEV" ROUTINE, FIG. 16F)

PROCESSING OF MULTILAYER WEAVE DESIGN DATA

BACKGROUND OF THE INVENTION

Multilayer fabrics commonly are woven on the same kinds of looms that are used to weave single-layer fabrics. In multilayer weaving the shedding of the warp threads is performed in such a way that the weft threads are disposed in a plurality of distinct planes each having its own sets of warp and weft threads which are not shared with those of another plane, except in those occasional instances where a thread of one layer may interlace with a thread of another layer in order to secure the two layers together at some points. The various layers have weave designs that may be similar or dissimilar.

The conventional "point paper" method for graphically constructing weave designs involves laboriously marking down on point paper (a type of graph paper) a symbolic representation of the way in which each warp thread interlaces with each weft thread to form the basic pattern or "repeat" of the weave design. The difficulties that normally attend the preparation of point paper charts for weaving single-layer fabric designs are greatly compounded in designing multilayer weaves, and the amounts of spoilage and undetected errors are likely to increase at greater than proportional rates as the number of layers is increased.

At present, there is great need for a multilayer weave designing technique that can be simulated by a digital computer, which is able to function more rapidly and with greater accuracy than a human designer to convert the basic weave pattern specifications automatically into weaving instructions for a loom. A similar need for multilayer weave designing techniques that can readily be implemented with computers also exists in other fields, such as woven circuitry or the weaving of small flexible conduits of various kinds.

SUMMARY OF THE INVENTION

A principal object of the invention is to provide a weave-designing method that can readily be implemented by a digital computer for automatically determining from basic weave pattern data the thread-actuating instructions that should be given to a loom for weaving a multilayer fabric in which the respective layers contain the specified weave patterns arranged in a desired overlapping or superimposed relationship.

This object is carried out in the present instance by a simulated graphical method that first arranges the weave patterns as nonoverlapping, diagonally adjacent blocks in a block diagonal matrix and the arranges outside of these blocks, but within the matrix, suitable indicia denoting the fact that the two weave patterns are to be located in separate layers of the fabric, and then proceeds automatically to interleave rows and columns of the large matrix without disturbing the integrity of the respective layers, until the desired overlapping relationship of the weave patterns in the respective layers is established, whereupon the system generates output data that can be used for controlling a loom to weave the multilayer design into fabric.

For example, let it be assumed that one wishes to weave a two-Layer fabric having in one layer thereof (which will be referred to as the "top" layer) a weave design comprising repeats of a pattern $W_1$, and having in its other layer (which will be referred to as the "bottom" layer) a weave design comprising repeats of a pattern $W_2$. It will further be assumed that each repeat of weave pattern $W_1$ is to be placed within approximately the same longitudinal and lateral boundaries as a repeat of the weave pattern $W_2$, in a one-for-one relationship throughout the fabric. Where the area normally occupied by one weave pattern is considerably less than the area occupied by the other weave pattern, the smaller weave pattern is to be expanded so that rows and columns are distributed as sparsely and evenly as possible within the area occupied by the larger weave pattern and are also suitably interleaved with the rows and columns of the larger weave pattern, whereby the two patterns are overlapped as completely as their respective characteristics will permit.

The present designing technique is distinctively characterized by the initial step of setting up a binary matrix which combines the respective weave pattern matrices $W_1$ and $W_2$ in the following symbolic relationship:

$$\begin{matrix} W_1 & 0 \\ 1 & W_2 \end{matrix}$$

In this matrix, the digit "1" symbolically denotes the fact that the coordinate positions defined by the portions of the rows located to the left of $W_2$ and the portions of the columns located beneath $W_1$ are filled with "1" bits, each indicating a warp thread crossing over a weft thread. The digit "0" in the above matrix symbolically denotes the fact that the coordinate positions defined by the portions of the rows to the right of $W_1$ and the portions of the columns above $W_2$ are filled with "0" bits, each indicating a weft thread crossing over a warp thread. Assume, for example, that $W_1$ is the plain weave pattern:

0 1

1 0 and that $W_2$ is the twill weave pattern:

1 0 0 1

0 0 1 1

0 1 1 0

1 1 0 0

The resultant matrix then appears initially as follows:

0 1 0 0 0 0

1 0 0 0 0 0

1 1 1 0 0 1

1 1 0 0 1 1

1 1 0 1 1 0

1 1 1 1 0 0

The 1's in the lower four positions of the first two columns, and the 0's in the upper two positions of the next four columns, denote the fact that the plain weave pattern $W_1$ is in the top layer, and the twill weave pattern $W_2$ is in the bottom layer of the fabric. For convenience, it will be assumed further that the bottom layer weave pattern $W_2$ is the mirror image of the visible weave pattern that actually is to appear on the bottom face of the fabric. This will enable $W_1$ and $W_2$ to be viewed simultaneously from one side of the fabric only, thereby facilitating the description of the disclosed system and its operation.

After the combined matrix has been set up, certain row-transposing and column-transposing operations are performed in order that the rows and columns of the smaller matrix $W_2$ will become interleaved as sparsely and evenly as possible with the rows and columns of the larger matrix $W_2$, without disturbing the integrity of the respective layers. The matrix that finally results from these various row and column interleaving operations will depict by its placement of 1 and 0 bits the manner in which the warp and weft threads are to be interlaced in order to place weave pattern $W_1$ in the top layer of the fabric in approximate alignment with weave pattern $W_2$ in the bottom layer of the fabric, each repeat of the weave design. This information then may be readily converted into weaving instructions for operating either a Jacquard or dobby-type loom to produce the desired two-layer fabric.

Certain of the inventive features disclosed herein also can be applied to problems that arise in connection with the weaving of electrical circuit wires or the weaving of small flexible conduits such as optical fibers or fluidic filaments.

The foregoing and other objects, features and advantages of the invention will be apparent from the following more particular description of a preferred embodiment of the invention, as illustrated in the accompanying drawings.

DESCRIPTION OF THE DRAWINGS

FIG. 1 is a schematic illustration of a conventional loom for weaving fabric.

FIG. 2 is an enlarged view showing the manner in which the warp and weft threads of a fabric are interlaced to form a plain weave, the threads being shown spaced apart for clarity of illustration.

FIG. 3 is a symbolic representation of the plain weave shown in FIG. 2, with the thread crossings being denoted by binary digits.

FIGS. 10, 11, and 12 are binary representations of three weave patterns to be incorporated in a three-layer weave design.

FIG. 13 shows the initial diagonal matrix prior to the performance of row and column-interleaving operations thereon.

FIG. 14 shows the matrix of FIG. 13 after the row-interleaving operation has been performed thereon.

FIG. 15 shows the final weave matrix after the column-interleaving operation has been performed upon the matrix of FIG. 14.

FIGS. 16A to 16F, when assembled as indicated by FIG. 16, constitute a flow chart of the main procedure or routine which may be followed in forming the multilayer weave matrix from the individual layer matrices, such a procedure being adapted for implementation by a programmed computer.

FIGS. 17A and 17B, when assembled in the manner indicated by FIG. 17, constitute a flow chart of a row-interleaving (or column-interleaving) procedure or subroutine which may be employed in conjunction with the procedure shown in FIGS. 16A to 16F.

FIG. 18 is a tabular representation of certain steps involved in a row-interleaving process.

FIG. 19 is a tabular representation of certain steps involved in the column-interleaving process.

DETAILED DESCRIPTION

Figure 4:
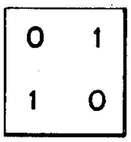
FIG. 4 is a small binary matrix representing the basic "repeat" of the plain weave pattern shown in FIG. 3.

As mentioned hereinabove, multilayer fabrics may be woven by the same type of loom which weaves single-layer fabric. Whether a woven fabric will have one or more layers is dependent upon the type of thread lifting instructions given to the loom. This will be explained in detail as the description proceeds.

FIG. 1 represents in simple form a conventional loom mechanism which is adapted to perform weaving operations in response to digital input data in the form of punched Jacquard cards or the equivalent electrical signals. A pattern selector 10 decodes or converts the input data to appropriate signals for selectively setting a heddle actuator 11 during each step of the weaving process. In response to each setting of the heddle actuator 11, certain of the heddles 12 are elevated or lowered with respect to the other heddles 12, as indicated, for example, in FIG. 1. (It will be understood, of course, that this figure shows only a small number of the many heddles that normally would be utilized in an actual weaving operation).

The warp threads 13 (i.e., those threads which run lengthwise of the woven fabric) are withdrawn from a warp beam 14 and are passed respectively through the eyes 15 of the various heddles 12. As the heddles are selectively raised or lowered with respect to each other, certain of the warp threads 13 are caused to diverge momentarily from the other warp threads 13. The angular space between the separated warp threads commonly is referred to as a "shed," and the process of selectively separating the warp threads is called "shedding."

The weft thread, also referred to as the "woof" or "filling" (not shown in FIG. 1), is inserted into the fabric by a shuttle 16 that travels back and forth across the path of the warp threads 13 within the space lying between the converging portions of these threads. Each time the shuttle 16 lays down a weft thread, an oscillatory reed 17 moves the shuttle in a direction such as to push the weft thread against the woven fabric 18, which is being woven onto a cloth beam 19. The heddles 12 then are restored to their normal aligned positions, causing the warp threads to interlace firmly with the weft thread.

The pattern woven into the fabric 18 is determined by the manner in which the heddles 12 are selectively raised and lowered in each step of the weaving operation. In the case of those warp threads 13 which were positioned above the shuttle 16, certain portions of these warp threads will remain above the weft thread that was inserted by the shuttle 16. In the case of those warp threads which were positioned beneath the shuttle 16, certain portions of these warp threads will be disposed beneath the corresponding portions of the weft thread. The various interlacings of the warp and weft threads define the textures and visual effects of the patterns exhibited by the woven fabric 18. (In the present description no account will be taken of color variations in the woven fabric design, attention being given only to the structural characteristics of the weave patterns.)

As an elementary example of a weave pattern, FIG. 2 depicts, in an enlarged and partly exploded manner, the way in which the warp threads 13 are interwoven with the weft threads 20 in the "plain-woven" fabric 18. In a plain weave, each weft thread 20 passes alternately over and under the successive warp threads 13, and vice versa. The portion of the plain weave shown in FIG. 2, may be represented by the equivalent pattern of 1's and 0's shown in FIG. 3, letting each warp-over-weft thread crossing be symbolized by a "1" while each weft-over-warp thread crossing is symbolized by a " 0." To simplify the weave representation even further, the basic "repeat" of the plain weave pattern may be represented by the two-by-two binary matrix of FIG. 4. In similar fashion, the "repeat" of a twill weave pattern may be represented by the four-by-four binary matrix shown in FIG. 5.

Figure 5:
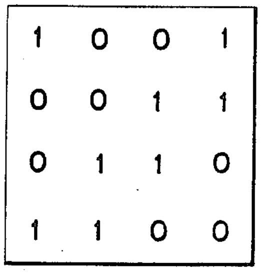
FIG. 5 is a binary representation of the basic repeat in a twill weave pattern.

As a simple example of a multilayer weave designing problem, let it be assumed that a plain weave (FIG. 2 or 3) is to be incorporated in the top layer of a two-layer fabric, while a twill weave (FIG. 5) is to be incorporated in the bottom layer. It will be assumed also that there will be one 2×2 repeat of the plain weave (FIG. 4) for each 4×4 repeat of the twill weave (FIG. 5). This relationship does not necessarily have to prevail in every case, since one could, if desired, specify a basic weave pattern matrix of different size for either of the two layers. Where the layer matrices are of different sizes, the smaller matrix will have to be expanded or "spread apart"

more than the larger one in order to fill the space ultimately allotted to it in the final weave matrix.

Figure 6:
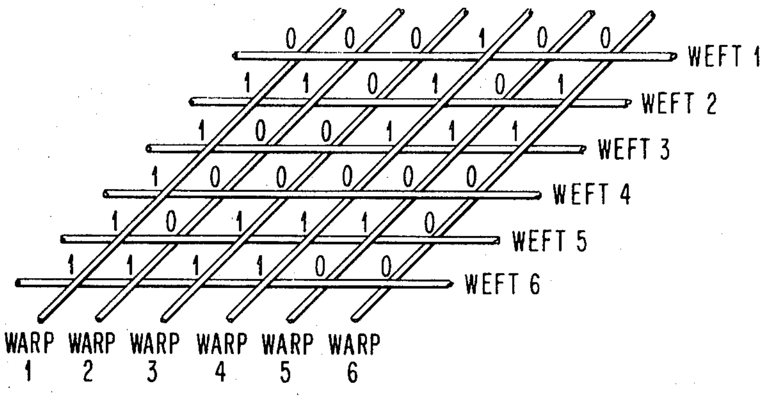
FIG. 6 schematically represents, in perspective, the manner in which warp and weft threads may be interlaced to form a multilayer fabric having in one layer thereof the plain weave pattern of FIG. 4 and having in the other layer thereof the twill weave pattern of FIG. 5.
Figure 7:
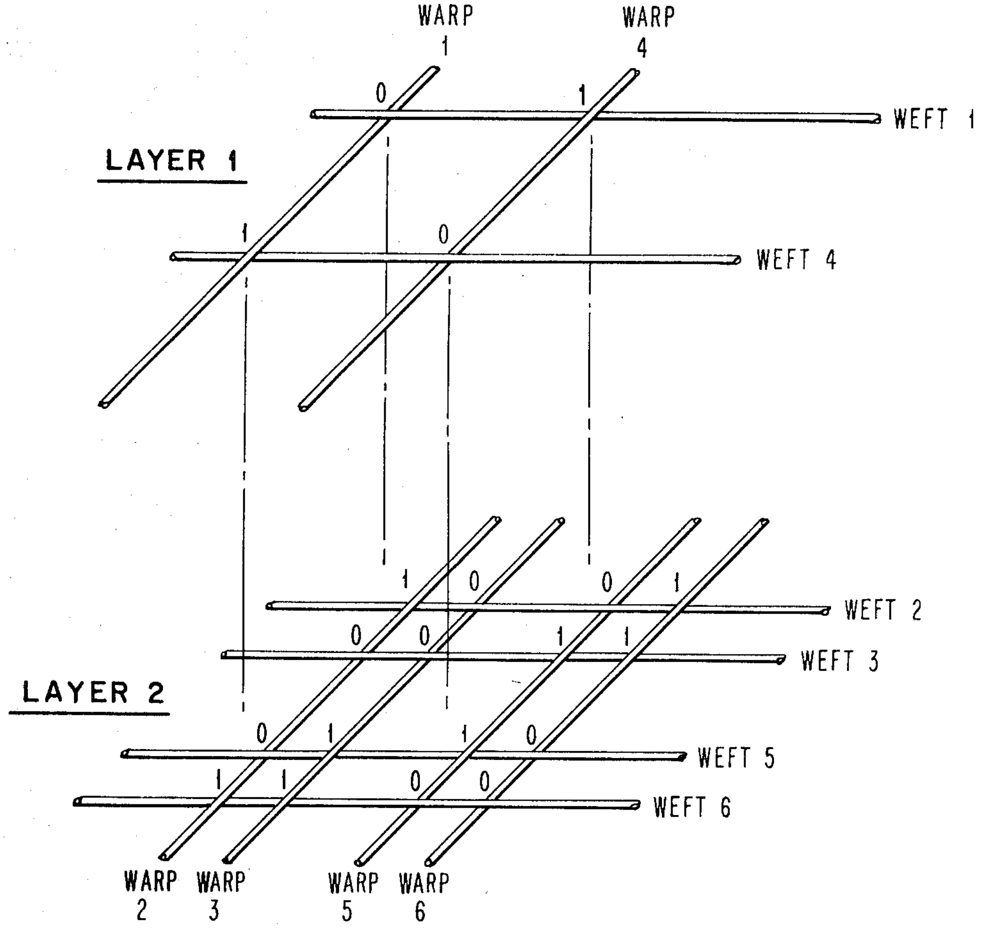
FIG. 7 is a diagrammatic perspective view showing the two layers of FIG. 6 separated from each other.

The sets of warp threads and weft threads are interlaced to form the weave pattern in each layer. Assuming, for example, that the plain weave pattern in the 2×2 matrix of FIG. 4 is to be superimposed upon the twill weave pattern in the 4×4 matrix of FIG. 5, the resulting weave will appear approximately as shown in FIG. 6, wherein two out of every six warp threads are allocated to the plain weave in the upper layer, while the remaining four warp threads are allocated to the twill weave in the lower layer. Likewise, two out of every six weft threads will be allocated to the plain weave in the upper layer, with the remaining four weft threads allocated to the twill weave in the lower layer. This relationship can more readily be seen in FIG. 7, which exaggerates the separation of the two layers. Each warp thread constitutes a column of the multilayer matrix, and each weft thread is considered to be a row of that matrix. It will be noted that the warp threads in columns 1 and 4, which belong to the upper layer matrix, lie above all the weft threads in rows 2, 3, 5, and 6, which belong to the lower layer matrix. Similarly, the weft threads in rows 1 and 4, which belong to the upper layer matrix, are disposed above all of the warp threads in columns 2, 3, 5 and 6, which belong to the lower layer matrix. Thus, each column in the upper matrix is, in this example, interleaved with a pair of columns in the lower matrix, and a similar relationship holds true for the rows in the upper and lower matrices.

The interleaving of rows and columns in the respective layer matrices should be accomplished in such a manner that the elements of each matrix are distributed as evenly as possible with respect to the elements of every other matrix. One of the objectives of the present invention is to enable such row and column interleaving operations to be accomplished as expeditiously as possible. Another important objective of this invention is to provide a simple and reliable process for handling a multilayer matrix assembling problem in a computer so that only elementary skill is required for initially setting up or entering the input data in the computer, including the specification of any interconnections that may be needed.

Figure 8:
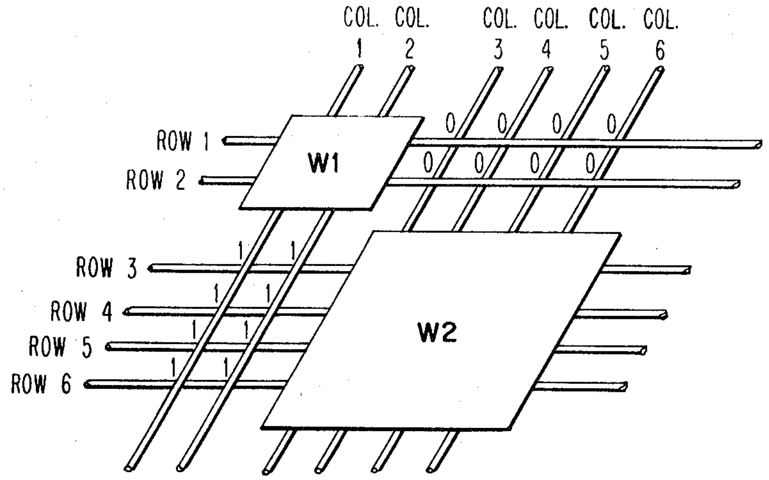
FIG. 8 indicates diagrammatically, in perspective, the manner in which a diagonal matrix may be formed to initiate a two-layer weave designing operation in accordance with the principle of the invention.

AS an introduction to the novel procedure just mentioned, reference is made to FIG. 8, which 1 shows in perspective the initial relationship of two weave matrices W1 and W2 that are respectively assigned to the top and bottom layers of a two-layer weave design. As a first step, it will be assumed that top layer matrix W1 is so positioned that it is displaced both longitudinally and transversely with respect to the bottom layer matrix W2. Stating this another way, all of the columns in matrix W1 are initially assumed to be displaced as a set to the left of all of the columns in matrix W2. Similarly, all of the rows in the top layer matrix W1 are assumed to be displaced as a set toward the top of the sheet with respect to all of the rows in the bottom layer of matrix W2, to insure that W1 is indeed the "top" matrix, and that W2 is indeed the "bottom" matrix. All of the row of column intersections positioned to the left of matrix W2 and toward the bottom of the sheet with respect to matrix W1 are assumed to be warp-over-weft thread crossings, each of which is represented by a 1 bit. In like manner, each of the row and column intersections positioned to the right of matrix W1 and toward the top of the sheet with respect to matrix W2 are assumed to be weft-over-warp thread crossings, each designated by a 0 bit. Thus, in our present example, where the input matrices are represented by FIG. 4 for the top layer and FIG. 5 for the bottom layer, the initial matrix will appear as follows:

```
010000
100000
111001
110011
110110
111100
```

More generally stated, the initial matrix is set up so that the top layer matrix W1 is at the upper left corner, the next layer matrix W2 is situated diagonally below and to the right of W1, etc., the result being a block diagonal matrix in which the layer matrices W1, W2, etc., lie along the diagonal axis in successive order. The lower left corner portion of the diagonal matrix is filled with 1's, while the upper right corner portion of this matrix is filled with 0's. This establishes an initial relationship among the matrices which insures that the rows and columns of the lowest numbered layer matrix will always remain above the rows and columns of higher numbered layer matrices, regardless of the way in which the respective rows and columns of the various matrices are shifted around and interleaved during subsequent operations. In other words, this initial setting up of a block diagonal matrix arrangement insures that the integrity of each layer matrix will be preserved throughout the remainder of the operation.

Figure 9:
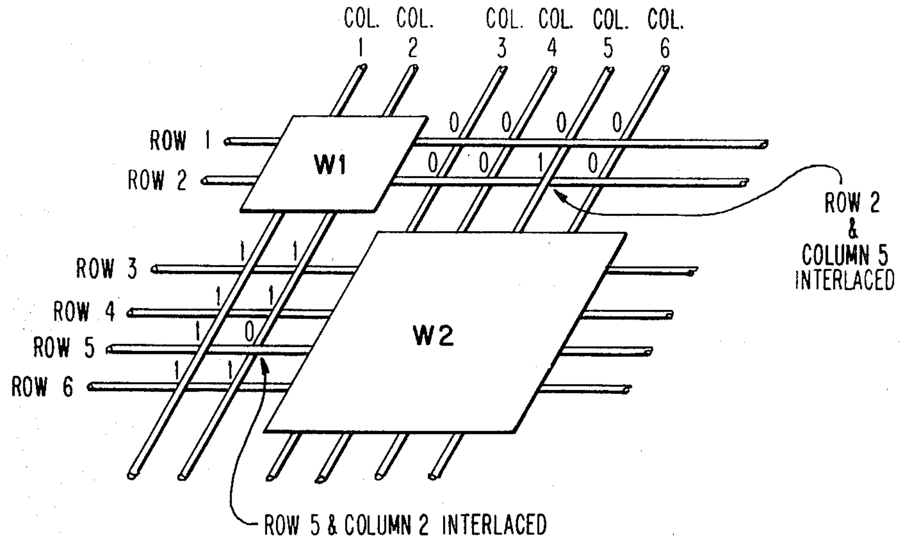
FIG. 9 is a perspective view similar to FIG. 8 indicating the manner in which desired interlacing between two layers may be defined in setting up the initial diagonal matrix.

The statement just made, however, must be qualified by the possibility that occasional interlacing between layers may be desired, this being a problem that will be dealt with in greater detail hereinafter. Interlacings or interconnections between layers are specified at the time when the initial diagonal matrix is set up. For example, referring to FIG. 9, let it be assumed that for some reason it is desired to interlace column 2 of matrix W1 with row 5 of matrix W2. This is accomplished in the initial setup of the matrix by changing the bit value at the intersection of row 5 and column 2 from 1 to 0. Similarly, if row 2 of matrix W1 is to be interlaced with column 5 of matrix W2, the 0 bit at the intersection is changed to a 1 bit. Thenceforth, the row presently identified as row 5 (i.e, the third row of W2) will always be connected to the column presently identified as column 2 (i.e., the second column of W1), and likewise, the row presently identified as row 2 (i.e., the second row of W1) will always be connected to the column presently identified as column 5 (i.e., the third column of W2), irrespective of the final positions which these various rows and columns may occupy after all of the row and column interleaving operations have been performed. This will be explained when the layer interconnecting operation is described in greater detail hereinafter.

FIGS. 10 to 15 pertain to the development of a three-layer weave design matrix using the three input weave matrices shown in FIGS. 10, 11 and 12. The first layer matrix W1, FIG. 10, has five rows and seven columns, or in other words, a row size of 5 and a column size of 7. The second layer matrix W2, FIG. 11, has row size 4 and column size 3. The third layer matrix W3, FIG. 12, has row size 2 and column size 4. When the three matrices W1, W2 and W3 are arranged in the form of a block diagonal matrix Z, as shown in FIG. 13, the total row size becomes 11 and the total column size 14. The intersections of the rows and columns in matrix Z define the coordinate grid position of this array. The row and column numbers of the first layer matrix W1 remain unchanged in the larger matrix Z. However, the row and column numbers of the other layer matrices W2 and W3 and changed in the new matrix Z, as shown. To complete the coordinate grid blocks, all of the coordinate grid positions to the left of or below the diagonal formed by matrices W1, W2 and W3 are filled with 1's, and all of the coordinate grid positions to the right of or above this diagonal are filled with 0's.

In the present example, it will be assumed that there are no interlacings between layers. The layer interlacing problem will be separately threaded hereinafter. Hence, no bit inversions will be performed in the all-1's or all-0's portion of the matrix Z in the current example.

The first step in the matrix transformation process is the row interleaving operation, which converts the matrix Z, FIG. 13, into the intermediate matrix Z′, FIG. 14. Then a column interleaving process is performed whereby the matrix Z′ is converted into the final multilayer matrix Z″, in which the rows and columns of each original layer matrix are interspersed as sparsely and evenly as possible among the rows and columns of each other layer matrix. Before dealing with the specific example now under consideration, it may be well to consider the interleaving problem in general. Assume by way of example that a set of A integers is to be interleaved with a large set of M integers to provide a set of M+A integers in which each integer of the A set is separated from the next integer of the A set by a subset of the integers in the M set. It is preferred that the intervening subsets of integers taken from the M set be of equal size, but if they cannot, then it is desired that the difference between the respective sizes of any two such subsets by no greater than 1.

Mathematically, it is possible to derive an interleaving algorithm which meets the foregoing requirements by proceeding as follows: First, express the quotient *MA* in terms of its integer portion *B* and its remainder portion *C* (if any), as follows:

$$M/A=B+C/A$$

This expression is, of course, equivalent to:

$$M=C+AB,$$

which equation is readily convertible to the following:

$$M=C(B+1)+(A-C)B$$

Thus, the set of *M* may be divided into *C* subsets of *B*+1 members each and *A*−*C* subsets of *B* members each, making a total of *A* subsets whose respective sizes do not differ from each other by more than 1. By placing one of these subsets of the *M* set between each pair of members of the *A* set, one will have interleaved the members of the two sets with each other as evenly as possible. This, essence, in the interleaving procedure that is followed in present scheme.

Thus, referring to FIGS. 13 and 14, it can be seen that the original rows have been rearranged, so that the two rows originally numbered 6 and 7 containing the first two rows of the second layer matrix W2, FIG. 13, now are positioned next to rows, 1, 2 and 4 containing the first three rows of the first layer matrix W1, FIG. 14, and these two rows are followed by the row originally numbered 10, which contains the first row of the third layer matrix W3. There then follow rows 4 and 5 of matrix W1, rows 8 and 9 (containing the lower two rows of matrix W2) and row 11 (containing the bottom row of matrix W3). The specific procedure for accomplishing this is described subsequently herein. The series of row numbers designated "Old Row Numbers" in FIG. 14, also referred to herein as the "row-interleaving vector," indicates the new permutation of the original set of rows.

During the row-interleaving operation depicted in FIG. 14, the original column positions remain unchanged. The next step is to interleave the columns. This is done in a similar manner according to the relative column sizes of the different layer matrices, as described in detail hereinafter. In the final matrix Z″ FIG. 15, the new permutation of the columns, using the old column numbers, is 1, 2, 3, 8, 11, 12, 4, 5, 9, 13, 6, 7, 10, 14. This sequence of numbers is otherwise referred to herein as the "column-interleaving vector."

The final matrix, FIG. 15, contains all of the row-by-row operating instructions for weaving a multilayer fabric containing the weave patterns of FIG. 10, 11 and 12 in the respective layers thereof. Each "1" in this matrix indicates that a warp thread is to pass over a weft thread at that point, while each "0" indicates that a weft thread is to pass over a warp thread at that point. This information is utilized in accordance with the type of loom in which the fabric is to be woven. For a Jacquard loom, each row of information is punched into a card, and the resulting series of cards is the agency which controls the lifting of the heddles through which the warp threads pass (FIG. 1). In the case of a dobby loom, which uses harnesses each controlling the movement of a certain combination of warp threads, the matrix shown in FIG. 15 must be further resolved into two constituent matrices, one representing the harness threading instructions and the other the harness lifting instructions, such that when these two matrices interact they will produce the resultant matrix desired.

The flow chart contained in FIGS. 16A to 16F depicts the main routine "DEV" for developing by an interactive man-computer operation a multilayer weave matrix such as Z″, FIG. 15, using input layer matrices such as those shown in FIGS. 10, 11 and 12. This flow chart, like the flow charts shown in other drawings, has a format such that each step therein (except a keyboard entry) is readily convertible into a single equivalent statement in the well-known "APL" programming language. This, of course, does not imply that the invention is limited to programming methods expressed in APL notation, inasmuch as the algorithm underlying the flow charts is not dependent upon any specific programming language for its implementation. APL is preferred for this type of computer-aided application because of its conciseness and the fact that it is well suited to interactive operations between a computer and a remote keyboard.

Textbooks which explain APL notation include the following:

APL/360 Primer, published by the International Business Machines Corp., 1969

APL/360 User's Manual, by A. D. Falkoff and K. E. Iverson, published by the International Business Machines Corp., 1968

APL/360 An Interactive Approach, by L. I. Gilman and A. J. Rose, published by John Wiley & Sons, 1970

Language, by K. E. Iverson, published by John Wiley & Sons, 1962.

Figure 16B:
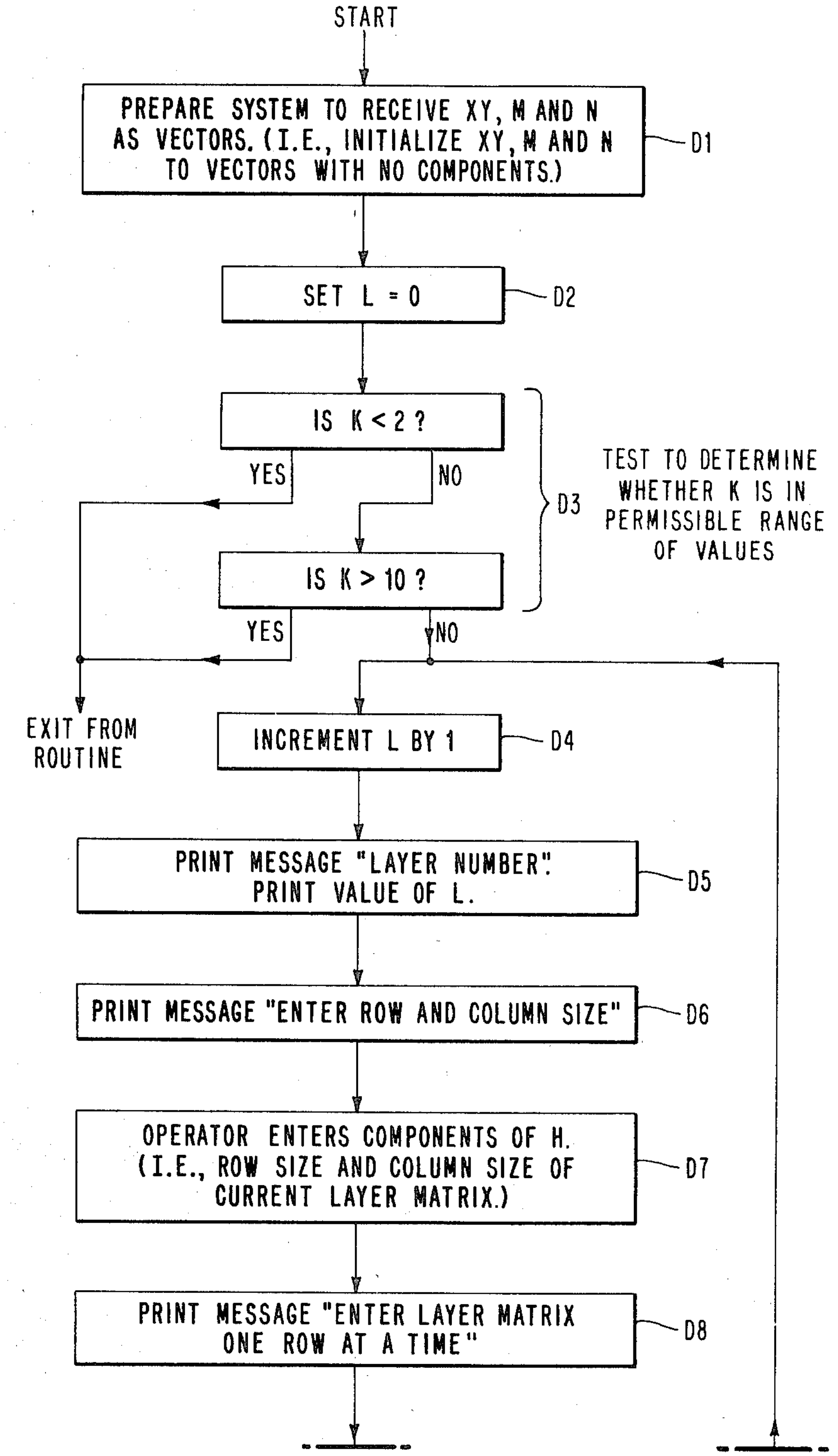

Certain steps, such as the steps D1 to D6 in FIG. 16B, for example, are intended to be performed automatically under program control. Other steps, such as D7, FIG. 16B, may be performed manually, that is, by entering information through a keyboard into the system. However, if desired, the system may be arranged so that the necessary input data is prestored and automatically extracted from storage as needed. Where a manual keyboard entry is to be effected, the system types out a symbolic notation indicating to the operator that it is awaiting a keyboard input, and the execution of the program will not be resumed until the requisite entry has been made by the operator.

It is assumed in the present description that the operator will communicate with the computer through an APL terminal unit or similar facility. The operator initiates the operation of the system by typing the name of the weave designing program or routine to be executed and the number of layers (K) in the multilayer weave that is to be designated. In the example presently under consideration, this would be accomplished by typing "DEV 3" and then returning the carriage of the terminal printing unit. The execution of the program then is automatically initiated. In step D1, the system prepares itself to receive three vectors XY, M and N, presently without components, whose respective components will be subsequently specified. At step D2 the value of L (current layer number) is initialized to 0. Step D3 is a test to determine whether the operator has specified an acceptable number of layers (K). If less than two layers were specified, then there is no purpose in performing a multilayer weave designing process, and the execution of the routine accordingly is terminated at that stage of the procedure. Likewise, if the specified number of layers should exceed an arbitrarily chosen upper limit, assumed to be 10 in the present case, the process likewise is terminated by exiting from the routine.

Assuming that K is in the acceptable range of values, the operation then proceeds automatically to step D4, where the layer number is incremented by 1. Since the operation is just commencing, L will increase from 0 to 1 in the present instance. At step D5, the terminal printing unit prints the words "LAYER NUMBER" followed by the number of the layer which is 1 in this case. At step D6, the machine prints the message "ENTER ROW AND COLUMN SIZE" and then awaits a keyboard input at step D7. The fact that the machine is awaiting an input may be indicated by automatically typing an appropriate symbol. The operator thereupon types in the row size and the column size of the current layer matrix, i.e., the components of the vector H. For example, if the current layer number is 1, and the layer 1 matrix is represented by FIG. 10, the row size is 55 and the column size is 7. Thus, the operator successively types the numerals 5 and 7 with a space between them and then returns the carriage. The operation then proceeds automatically to step D8, where the machine prints a message "ENTER LAYER MATRIX ONE ROW AT A TIME," and it proceeds immediately to step D9, FIG. 16C, where the variable J is initialized to a zero value.

It may be well to mention at this point that the system must perform certain automatic steps (D9 through D11) before it is ready to start receiving the rows of the current layer matrix. These steps of the operation are performed quickly, while the operator is preparing to type in the requested data. After step D9 is accomplished, step D10 is performed, during which an array designated X is set up initially as a two-dimensional array of 0's having its row size and column size specified by the components of the vector H (step D7). The choice of the bit value 0 is optional in this instance. Then, at step D11, the value of J is incremented by 1, thereby advancing from 0 to 1 in the present instance. The operation then proceeds to step D12, where the machine types an appropriate symbol indicating to the operator that the system is awaiting a keyboard input. The operator thereupon specifies the J'th component of X, i.e., the J'th row of the array X, by keying the corresponding row of the current layer matrix, such information replacing the 0 formerly occupying that row of X. In the present instance, with J=1, the first row of the current layer matrix will be typed. Then, while the operator is preparing to type in the next row, the operation of the system advances to step D13, where a test is made to determine whether the final row of the matrix has been specified. Since this is not true at present, the operation loops back to step D11, where J is incremented by 1 to designate the next succeeding row of the current layer matrix.

At step D12, the machine indicates to the operator that the next row of the current layer matrix is to be specified, and the operator accordingly keys in the appropriate row of data and returns the carriage, effectively overwriting the 0's previously occupying this row. At step D13, a test again is made to determine whether this is the final row, and if not, iterative loop consisting of steps D11, D12, and D13 is repeated as many times as necessary, until the final row of the current layer matrix has been keyed in. At this time the array X, having received rows of binary data which supersede all of the rows of 0's initially set up therein will be identical with the current layer matrix. The test at step D13 now is satisfied, inasmuch as the number of rows that have been keyed in equals the specified row size of the current matrix. The operation then proceeds to step D14, at which point the system operates the terminal unit to print the word "LAYER" followed by the current layer number; then it prints on the next line the words "LAYER MATRIX IS," and finally it prints on successive lines the successive rows of the array X, constituting the weave pattern of the current layer represented in binary matrix form (as in FIG. 10, for example).

Several automatic operations (steps D15 through D20, FIGS. 16C and 16D) now are performed by the system before it receives the next layer matrix input. At steps D15 and D16, respectively, the first and second components of the current vector H (i.e., row and column size of the current layer matrix) are appended respectively to vector M and vector N, the components of which are to represent all of the row sizes and all of the column sizes, respectively. This cumulative row size and column size information subsequently will be needed in the row and column interleaving operations, to be described hereinafter in connection with FIGS. 17–19. At step D17, the two-dimensional array X is converted into an extended one-dimensional vector having a number of components equal to the product of the current row size times the current column size. In other words, all of the elements of the array X now are strung out as a vector. In step D18, this X vector is appended to the vector XY (which until now has been an empty vector, since the current layer matrix is the first one to be processed). Ultimately, the vector XY will include all of the elements of all the layer matrices, but at present in includes only those of the first matrix.

At step D19 (an optional step) the components of the vector XY are printed out. This is done mainly for error checking purposes, and step 19 may be eliminated once the reliability of the process has been established. At step D20, a test is made to determine whether the final layer matrix has been processed. Since this is not true in the present case, the operation branches back to step D4, FIG. 16B. The layer number L is incremented a step D4 to prepare the system for receiving the next layer matrix. The operation then proceeds essentially as described above for steps D5 through D13, and at step D14 the weave pattern of the current layer is printed out.

At steps D15 and D16, the row size of the current layer matrix is appended to vector M, while the column size of this matrix is appended to vector N. Steps D17 and D18 are performed, causing the elements of the current layer matrix to be appended as additional components to the vector XY. The new value of vector XY then may be printed at step D19, if desired. At step D20, the system inquires whether the current layer is the final layer. If not, the operation again branches back to step D4, causing steps D4 through D20 to be repeated.

Figure 16C:
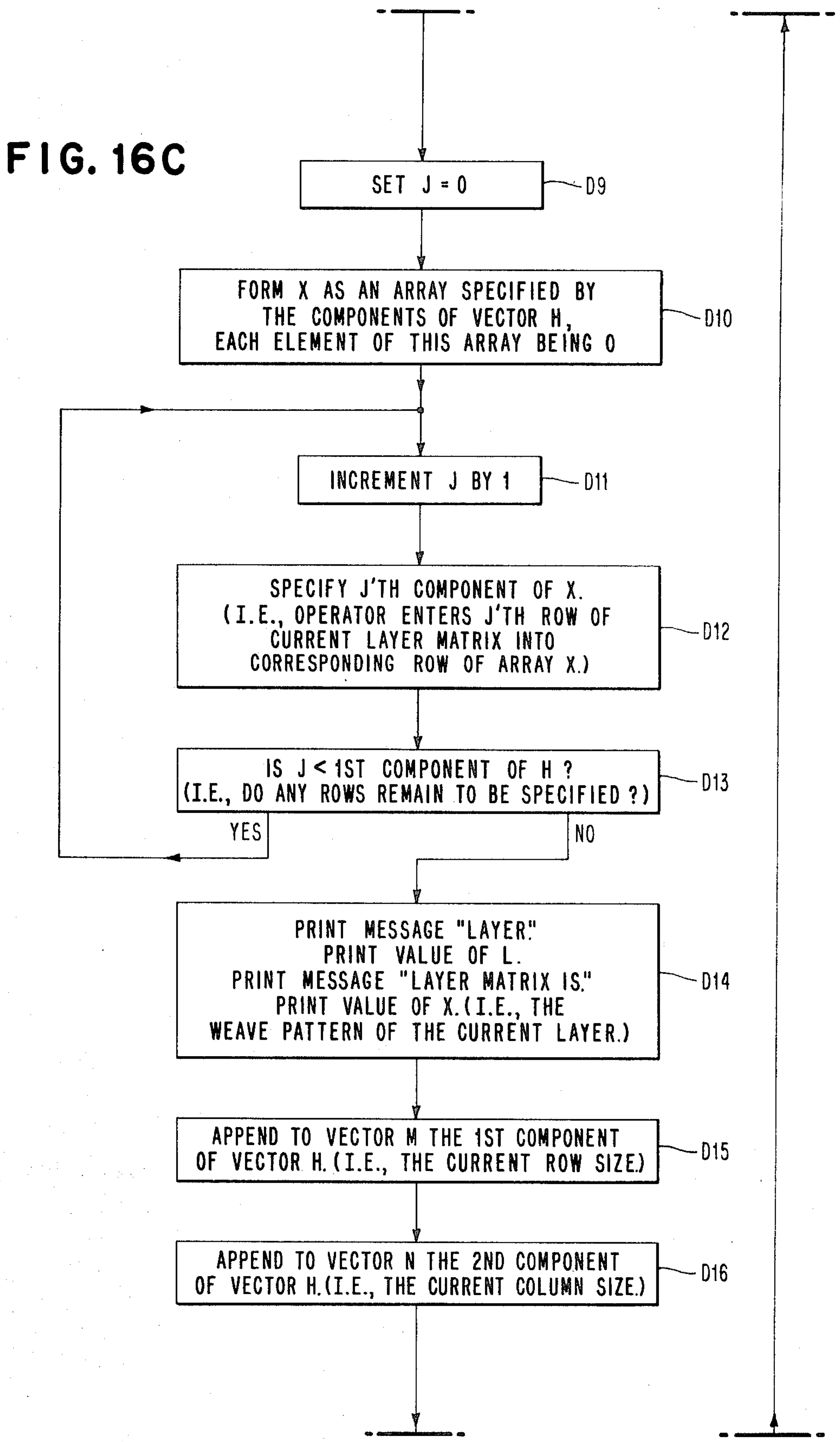
Figure 16D:
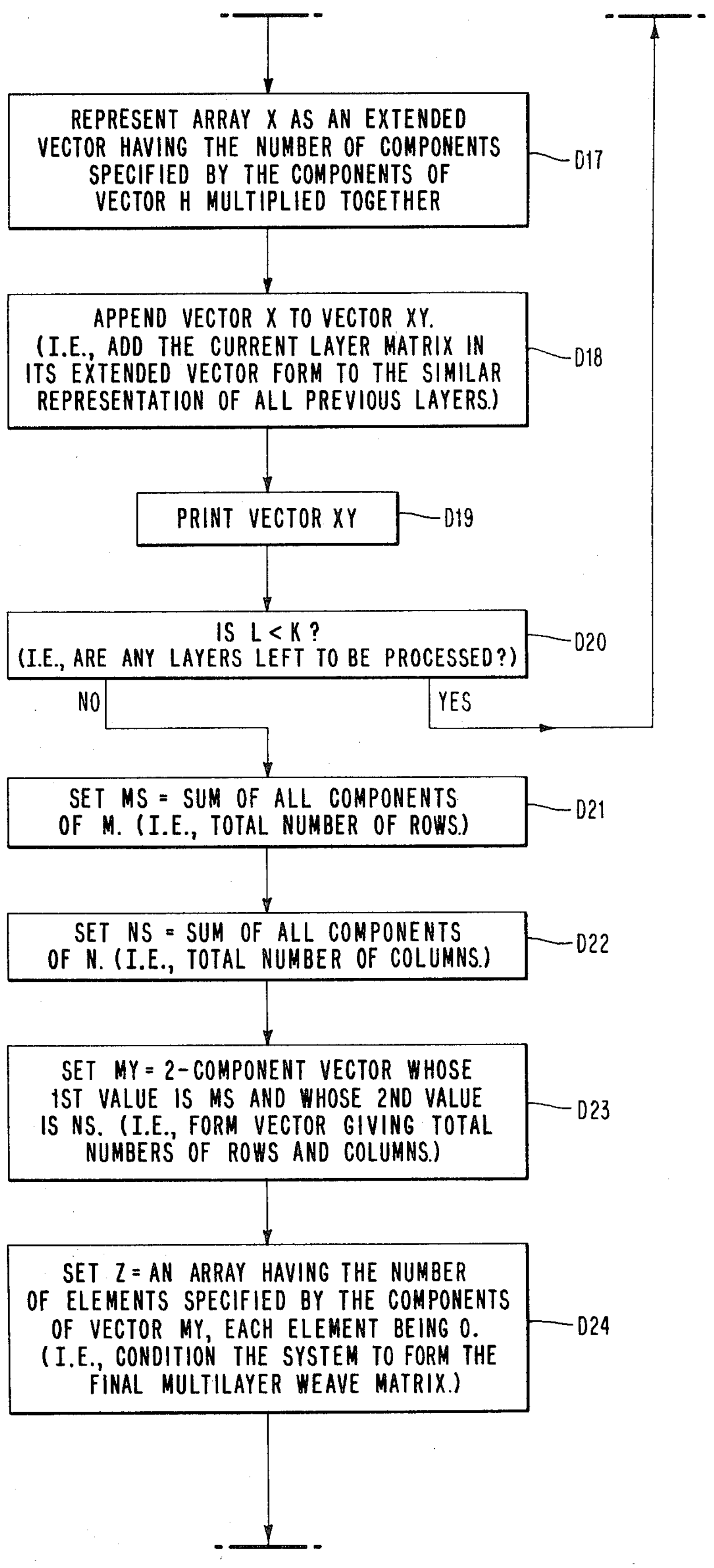

When the final layer matrix has been entered via the terminal keyboard and processed by the system through step D20, the operation then advances to step D21 FIG. 16D, where the value of MS (total number of rows in all layer matrices) is determined. At step D22, a similar function is performed to determine the value of ND, the total number of columns in all layer matrices. At step D23, the values MS and NS are assembled into a two-component vector MY, whose components respectively are the number of rows and the number of columns in the multilayer matrix that is to be assembled. At step D24, the system is instructed to form a two-dimensional array Z having the total number of elements specified by the components of vector MY, each element of Z initially being 0. This step conditions the system to form the final multilayer weave matrix.

Figure 16E:
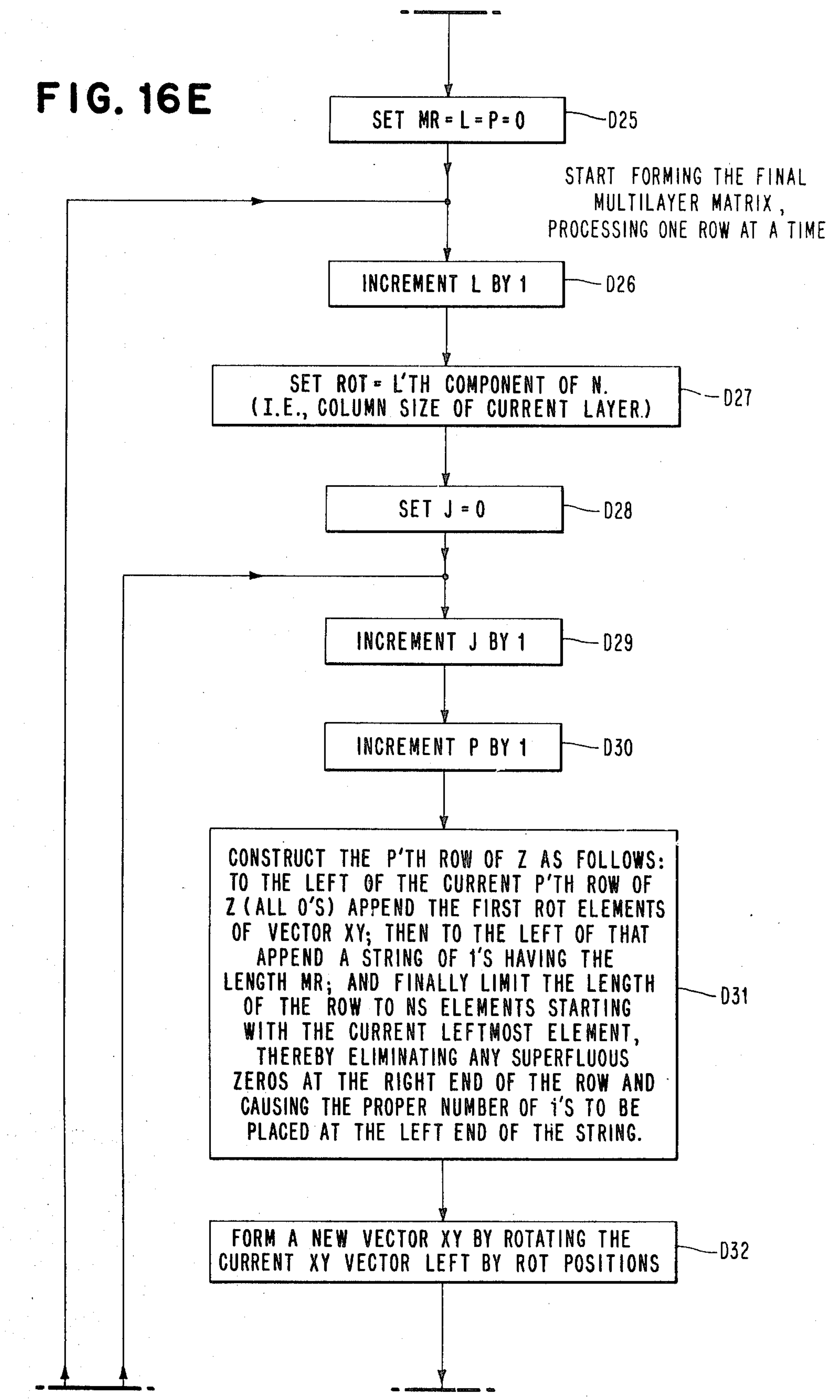

At step D25, FIG. 16E, an additional conditioning operation is performed by setting the values of the variables MR, L and P to 0. The formation of the final block diagonal matrix Z, one row at a time, now commences. At step D26, the value of L, the layer number (recently reset to 0 in step D25) is now incremented by 1. At step D27, the variable ROT is set equal to the L'th component of vector N, i.e., the column size of the current layer. At step D28, the valve of J (row number in current layer matrix) is reset to 0. Then, at step D29, J is incremented by 1. P, the row number in matrix Z, is incremented by 1 at step D30. At the present time, the respective values of J and P now stand at 1, and the system is ready to form the first row of the block diagonal matrix Z (FIG. 13).

Step D31, FIG. 16E, although it appears to involve many functions, actually may be defined by a single APL statement or a similar high-level programming language statement. In effect, it instructs the system to form the current row of the matrix z by first taking the string of 0's presently in this row and appending to the left of it the first ROT elements of vector XY (ROT having previously been set equal to the column size of the current interconnection matrix), then appending to the left of that a string of 1's having the length MR (i.e., the total column size of all preceding layers), and finally limiting the length of the current row to the value NS (the column size of matrix Z). This eliminates the superfluous 0's at the right end of the string, leaving the correct number of 1's (if any) at the left end of the row and the correct number of 0's (if any) at the right end of the row. The formation of the current or P'th row of matrix Z now is completed.

At step D32, the elements of the vapor XY are rotated or shifted left by ROT positions, bringing the next row of the current layer matrix into the forward positions of this vector. At step D33, FIG. 16F, the system requires whether any rows of the current layer remain to be processed. If so, the operation branches back to step D29. Steps D29 through D33 are repeated until all rows of the current layer matrix have been entered into the appropriate rows of matrix z, along with the requisite numbers of 1's (if any) and 0's (if any) to fill out those rows. When the test at step D33 shows that all rows of the current layer matrix have been processed, the system then prepares to process the next layer matrix which, when positioned in the matrix Z, is going to be offset diagonally with respect to the layer matrix just processed.

At step D34, the current value of the variable MR is increased by the L'th elements of N (current column size), thereby readjusting the length of the 1's string to be inserted to the left end of each row of the matrix Z to account for the rightward displacement of the next layer matrix. At step D35, the system inquires whether the final layer has been processed. Since it has not, the operation now branches back to step D26, FIG. 16E, where the layer number L is incremented by 1. Steps D26 through D35 are performed as many times as needed until the last layer matrix has been incorporated into the diagonal matrix Z.

When the test at step D35 shows that the last layer has been processed, the operation proceeds to step D36, where the machine prints the message: "MATRIX BEFORE TRANSFORMATION IS," and then prints the matrix Z. If any interlacings between layers are to be specified, the steps required to define the interlacing points within he matrix Z will be accomplished right after step D36 is completed. For the present, it will be assumed that no such interconnection is desired, and the operation therefore will process to the row interleaving and column interleaving functions (steps D37–D40). However, if one should desire to specify interconnections between layers, this may be accomplished by a "CON" subroutine (to be described hereinafter with reference to FIGS. 20–21C) which is inserted between steps D36 and D37 of FIG. 16F, i.e., before any row and column interleaving functions are performed.

Having reached the point where the block diagonal matrix Z, FIG. 13, has been defined, 1 system now must perform first a row interleaving operation for converting the matrix Z to an intermediate matrix Z' (FIG. 14), and then a column interleaving operation for converting the intermediate matrix Z' to the final matrix Z'' (FIG. 15). As a first step in this interleaving process, the system forms a row interleaving vector VM (corresponding to the series of numbers designated "Old Row Nos." in FIG. 14), which indicates the manner in which the rows of matrix Z are to be rearranged. The procedure whereby the row interleaving vector VM is formed is indicated generally at step D37 in FIG. 16F and is shown in detail in the flow chart of FIGS. 17A and 17B. A similar process is used to form the column interleaving vector VN (step D38, FIG. 16F). All that is needed to initiate the procedure for forming either vector is to call the subroutine "INT M" "INT N," where "INT" specifies the interleaving vector-forming function, and "M" or "N" specifies its argument (row size vector M or column size vector N).

Figure 17B:
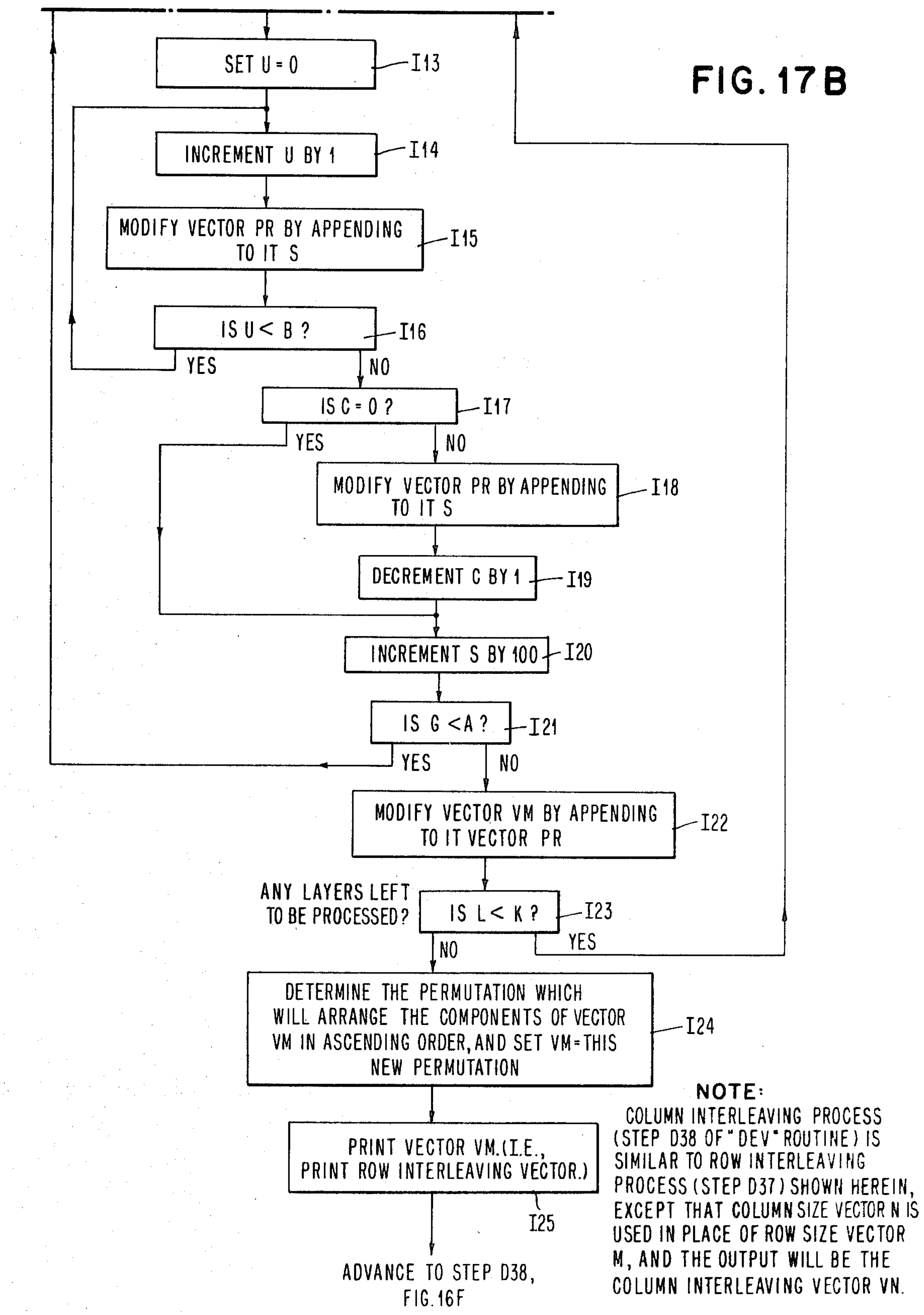

FIGS. 17A and 17B show the function INT as applied to the argument M (row size vector). It will be recalled that the vector M was build up by repeatedly performing step D15. FIG. 16C, until finally it included the respective row sizes of all the layer matrices. This supplies all of the information now needed to determine how the rows of the various layer matrices should be interleaved with each other. In going through the "INT" flow chart, it will be found helpful if reference is made also to FIG. 18, which depicts in tabular form the actions that take place in the associated flow diagram of FIGS. 17A and 17B.

Referring now to FIGS. 17A and 17B, the first step I1 in the INT subroutine causes a reset of the variable F to zero. Then, at step 12, the system prepares itself to receive the vector VM, which presently has no components. At step I3, the variable A is set equal to the smallest component of vector M. i.e., the smallest row size among all of the layer matrices. At step 14, the layer number L is initialized to 0, and at step 15, it is incremented by 1 to designate the current layer number. At step 16, F is incremented by 10. The number "10" is selected to correspond with the arbitrary upper limit 10 on the number of layers that can be processed, and it is chosen to provide adequate clearance among components of the vector VM as they are assembled. This will become apparent as the description proceeds.

At steps 17 and 18, respectively, the system determines the values of the integer portion B and the remainder portion C of the quotient formed by dividing the L'th element of vector M (current row size) by A (the smallest row size). Having accomplished this, the system proceeds to step I9, where the variable G is reset to 0. (G is an index value which goes from 0 to A.) At step I10, the system prepares to receive PR, a vector which presently has no component. At step I11, the variable S is set equal to F.

The system now prepares to "count off" or segregate the respective subsets of the set of rows in the current layer matrix. The index value G is incremented by 1 at step I12. At step I13, the variable U (or index value which goes from 0 to B) is reset to 0. Then, at step I14, U is incremented by 1. At step I15, the current value of S is appended as a component to the vector PR. (This can be seen at the leftmost position of PR in FIG. 18.) At step I16, a test is made to determine whether U has reached the value of B. Since it has not, the operation loops back to step I14, where U is incremented by 1. Steps I15 and I16 are repeated. The iteration involving steps I14, I15 and I16 is repeated until the index value U equals B, and with each such pass the current value of S is appended as an additional component to the vector PR. The operation then advances to step I17, where the system inquires to determine whether there is a remainder C in the quotient M[L]A. If the remainder is 0, steps I18 and I19 are bypassed. If C is not 0, the value S again is appended to the vector PR (step I18), and C is decremented by 1 (step I19).

The performance of steps I12 through I19 determines which rows of the current layer matrix will be included in the currently defined subset of such rows to be interleaved between two rows of the smallest matrix. A new subset of rows now is to be defined. To prepare for this, S is incremented by 100 at step I20 (100 being an arbitrary amount selected on the basis of the conditions assumed for the present example). At step I21, a test is made to determine whether G has reached the value of A. (I.e., have all of the subsets of rows been defined among the rows in the current layer?) If G is still less than A, the operation branches back to step I12, and steps I12 through I21 are repeated. If in the course of such an iteration the value of C goes to 0, the subset of rows formed during that iteration will be one less than the subset that would be formed if C were not zero. In any event, the largest and smallest subsets of rows in any given layer will not differ in size by more than one row, following the procedure herein specified. This will enable the row interleaving process to be accomplished with as uniform a row distribution as possible.

When the index value G reaches A (step I21), the formation of the vector PR for the current layer matrix will have been completed (FIG. 18), and the components of vector PR now are transferred to the vector VM (step I22). At step I23, the system inquires whether there is another layer to be processed. If there is, the operation branches back to step 15. Steps 15 through I23 are repeated for the new layer matrix, building up a vector PR for that matrix and appending the new vector PR to the current vector VM, FIG. 18.

When the last row of the last layer has been processed, the operation advances to step I24, FIG. 17B, where a "grading up" function is performed to determine which permutation of the components of vector VM will arrange these components in ascending order. In the APL programming language, such a function can be specified by a relatively simple statement. As a result of this grading-up process, the row numbers of the matrix Z are rearranged in the final vector VM, as indicated in FIG. 18, so that this vector VM now constitutes a row interleaving vector. If desired, this vector VM may be printed out (step I25) for the operator's inspection.

Figure 16F:
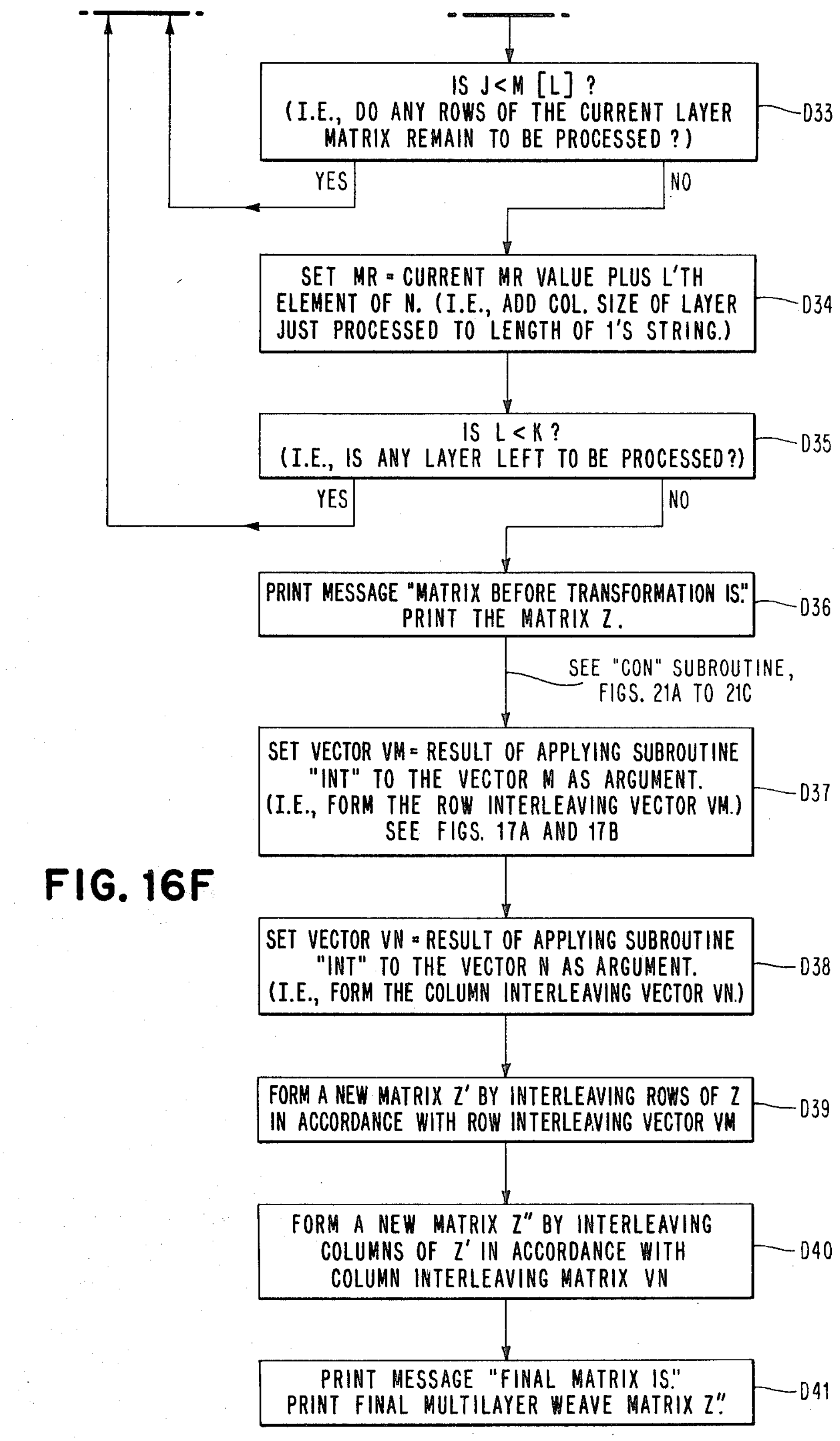

The formation of the row interleaving vector VM having been accomplished, the operation now proceeds to step D38, FIG. 16F, where a similar function is performed using N as an argument in order to construct a column interleaving vector VN. The various steps involved in this process will not be described in detail, being very similar to the steps shown in FIGS. 17A and 17B except that the column size vector N is used as an argument in place of the row size vector M. FIG. 19 depicts the action which takes place during this process, the output of which is the column interleaving vector VN.

With the row and column interleaving vectors VM and VN having been formed, the operation proceeds to step D39, FIG. 16F, where the rows of matrix Z are reordered in accordance with the row interleaving vector VM in order to form the matrix Z′. Following this, at step D40, the columns of matrix Z′ are reordered in accordance with the column interleaving vector VN to produce the final multilayer weave matrix Z″. As a final step (D41), the machine prints the words "FINAL MATRIX IS" followed by the matrix Z″. It is, of course, obvious that the output may take any other desired form, such as cards or tape.

Thus far, it has been assumed that the layers are woven without interconnections or interfacings between them. In practice, it is desirable that there be at least an occasional interlacing of the layers. Furthermore, if the above-described process is being applied to the design of woven wire circuitry, there frequently may be need to specify interconnections among wires in the different layers. To facilitate the incorporation of this feature into the weave designing process, the procedure set forth in FIGS. 20–21C is provided.

Figure 20:
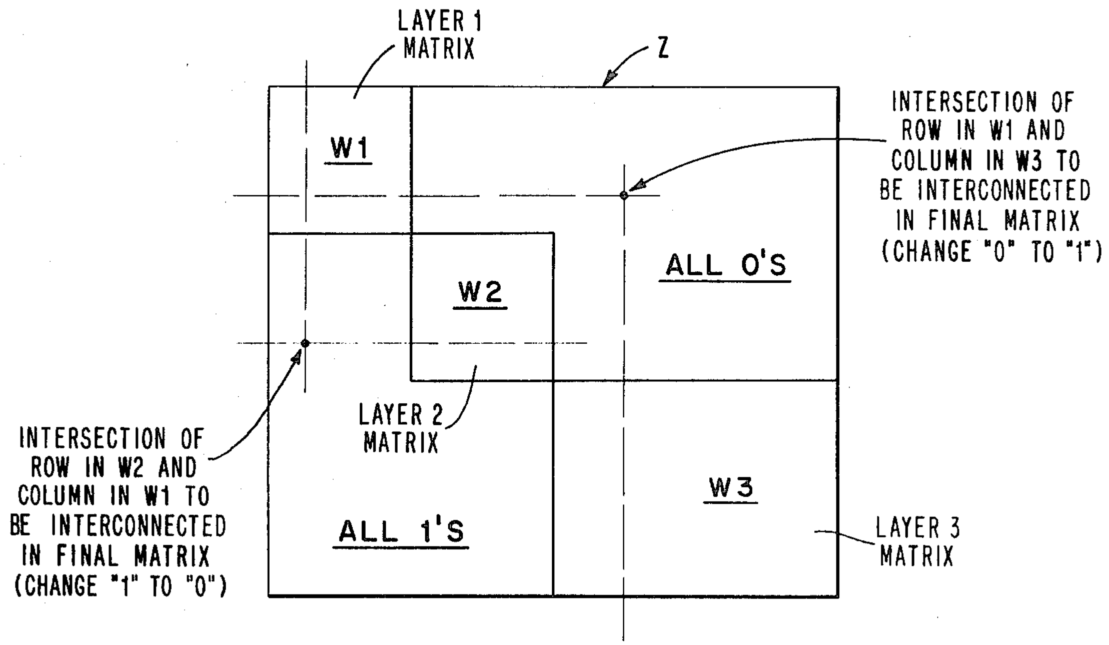
FIG. 20 is a diagrammatic representation of certain steps involved in forming interconnections between layers.
Figure 21:
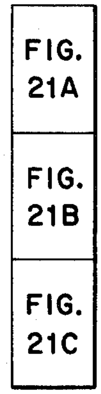
FIGS. 21A to 21C, when assembled in the manner indicated by FIG. 21, constitute a flow chart of a layer interconnecting procedure or subroutine that may be employed in conjunction with the procedure shown in FIGS. 16A to 16F.

Referring first to FIG. 20, the operator first decides which columns or rows of the various layers are to be interconnected. In some instances, this may be a random selection. In other instances (e.g., where one is designing woven circuitry), the section will be dictated by more definite criteria. In the present scheme, the interconnection data are communicated to the system after the block diagonal matrix Z has been formed and printed out (step D36, FIG. 16F) and before the row and column interleaving operations commerce.

Figure 21A:
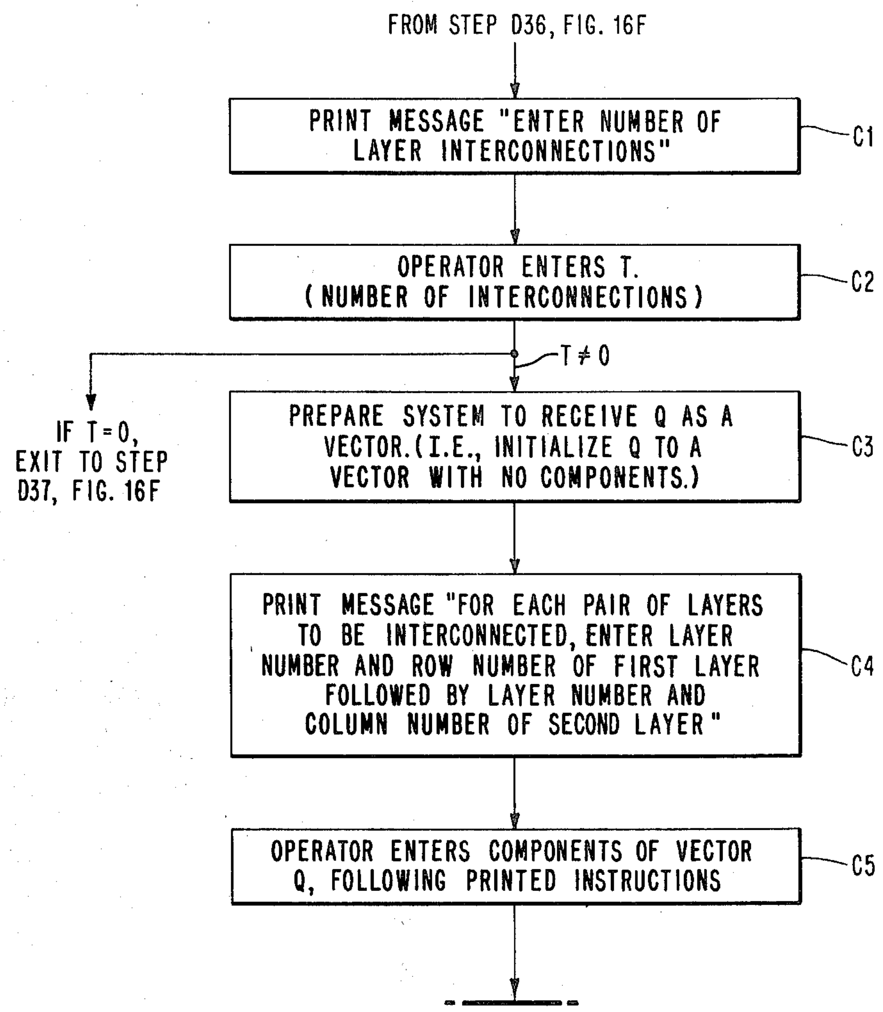
Figure 21B:
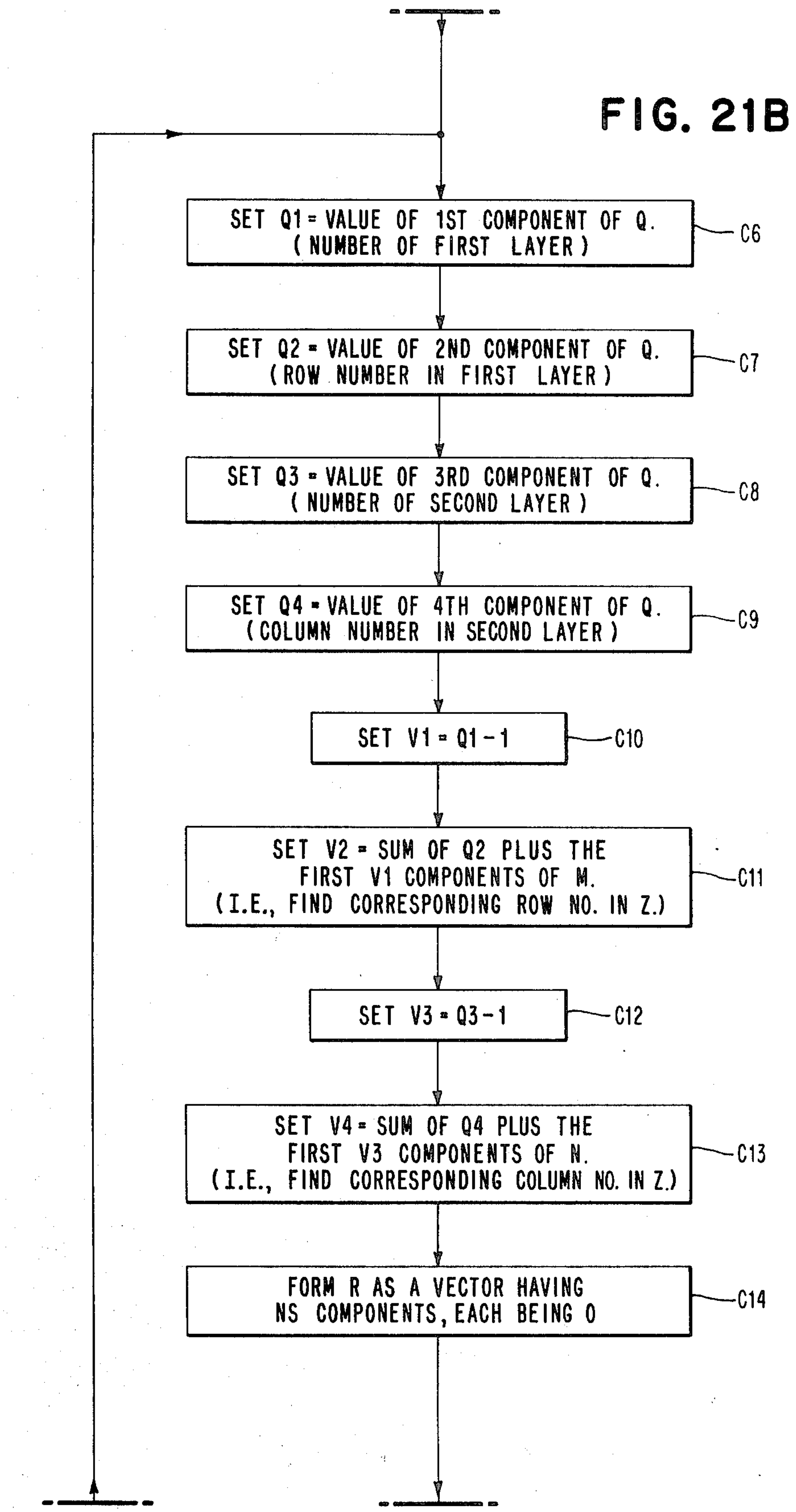
Figure 21C:
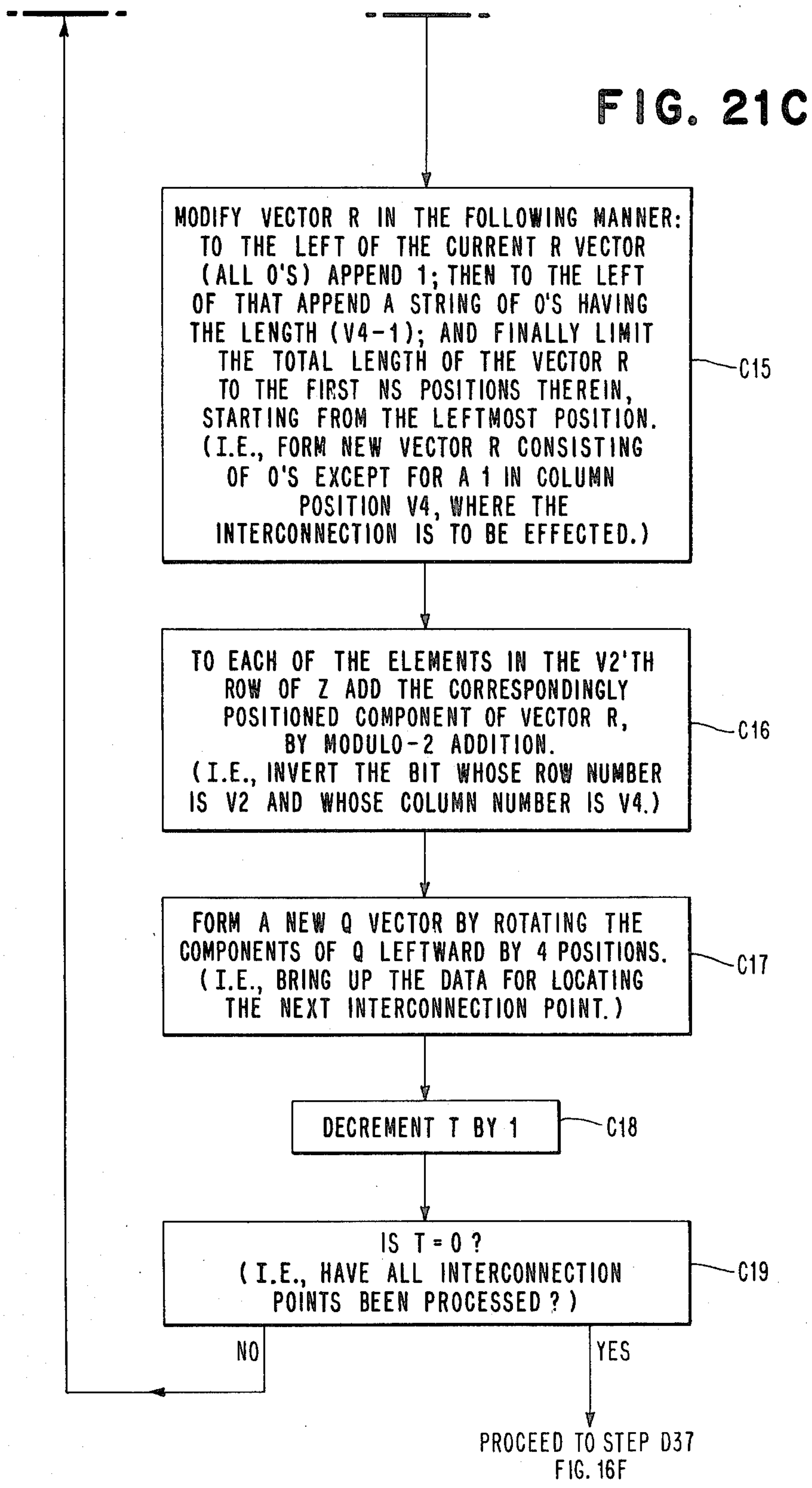

It will be assumed from this point on that the "CON" subroutine shown in the flow chart of FIGS. 21A–21C is interposed between steps D36 and D37, FIG. 16F. After the formation of the diagonal matrix Z in step O36, the operation proceeds to step C1, FIG. 21A, where the machine prints the massage "ENTER NUMBER OF LAYER INTERCONNECTIONS" and then awaits a keyboard entry at step C2. The operator keys in the total number of interconnections that are to be established among the layer matrices. If zero interconnections are specified, the operation immediately advances to step D37, FIG. 16F. This step is obvious, and it has not been represented by a flow chart box in FiG. 21A.

At step C3, the system prepares to receive a vector Q, which at present, has no component. The machine then prints (at step C4) the message "FOR EACH PAIR OF LAYERS TO BE INTERCONNECTED, ENTER LAYER NUMBER AND ROW NUMBER OF FIRST LAYER FOLLOWED BY LAYER NUMBER AND COLUMN NUMBER OF SECOND LAYER," or some equivalent message. The layers are handled in pairs, with the layer containing the designated row being by definition the "first layer," and the layer containing the designated column being by definition the "second layer" of each pair. In response to these directions, at step C5, the operator then enters the components of vector Q in successive sets of four numbers each, the first and second numbers in each set specifying the numbers of the "first layer" and row therein while the third and fourth numbers specify the numbers of the "second layer" and column therein. The terms "-first layer" and "second layer" do not necessarily mean that the first layer must have the smaller layer number in each case.

At steps C6 through C9, the following actions occur: A scalar variable Q1 is set equal to the first component of vector Q (first layer number); scalar variable Q2 is set equal to the second component of vector Q (number of the row in the first layer in which the interconnection is to be located); scalar variably Q3 is at equal to the third component of the vector Q (second layer number); and scalar variable Q4 is set equal to the fourth component of the vector Q (number of the column in the second layer in which the interconnection is to be located). At steps C10 through C13, certain scalar transformations are effected. A variable V1 is set equal to Q1–1. A variable V2 is set equal to the sum of Q2 plus the first V1 components of vector M, so that V2 will be the number of the row in matrix Z corresponding to the Q2'th row of the first layer numbered Q1. A variable V3 is set equal to Q3–1. A variable V4 is set equal to the sum of Q4 plus the first V3 components of vector N, so that V4 will be the number of the column in matrix Z corresponding to the Q4'th column of the second layer numbered Q3. Thus, the row and column coordinates V2 nd V4 of the current interconnection point in the matrix Z have been defined.

At step C14, the system forms a new vector R containing NS components, each being 0 ("NS" being the total number of columns in Z). At step C15, the vector R is modified in the following manner: To the left of the current R vector (all 0's) is "1" bit is appended, and to the left of this, there is appended a string of 0's having a length V4–1. Finally, the length of the vector R (starting from the leftmost component thereof) is limited to NS component. The vector R now consists of 0's except for a "1" in column position V4, where the interconnection point is to be specified.

At step C16, the vector R is added by modulo-2 addition to the vector which constitutes the V2'th row of matrix Z, and the resulting vector is substituted for the current V2'th row of Z. The effect of this is to invent the bit in the V4'th position of that row, changing a "1" to a "0" or vice versa. This is all that is needed to specify an interconnection between the Q2'th row of the layer whose number currently is Q1 and the Q4'th column of the layer whose number currently is Q3. During any subsequent row and column interleaving operations, the identity of this interconnection point will remain unchanged; i.e., the two layers whose numbers currently are equal to Q1 and Q3, respectively, will be marked as ultimately having a point of interconnection at the position where their Q2'nd row and Q4'th column, respectively, cross each other, regardless of any intermediate changes in the positions of said row and said column due to the interleaving operations.

AT step C17, FIG. 21C, the components of the present Q vector are rotated or shifted leftward by four positions, thereby bringing the next set of four Q-vector components into the Q1 through Q4 positions of this vector, so that the next layer interconnection point may be marked in the matrix Z, using the new set of data in the manner described above. At step C18, the number of interconnections T left to be processed is reduced by 1, and at step C19, the system inquires whether all interconnection points now have been processed. If not, the operation returns to step C6, FIg, 21A, and steps C6 to C19 then are repeated. Eventually T reduces to 0 ending the "CON" subroutine, and the operation then proceeds to step D37, FIG. 16F, in the main DEV routine, when the interleaving operations commence.

The end result of executing the various functions described hereinabove is to produce a multilayer weave design matrix in which the various input weave patterns now are located in woven layers that generally are separate from each other, except at specified interconnection points where warp threads of some layers may interlace with weft threads of outer layers for binding the layers together at those points. The binary information in the final matrix, when applied row by row to the heddle actuator 11, FIG, 1, will cause the warp threads 13 to be selectively raised and lowered according to the pattern of 1's and 0's in each row and thereby will cause the loom to weave the desired weave patterns into the respective layers of the multilayer fabric 18.

Summarizing the advantages of the disclosed invention, the procedure described herein will enable a designer-operator to simulate on a computer, by the interactive process, the design of the multilayer fabric in which each layer has a distinctive weave pattern. The same procedure, if performed manually by the conventional "point paper" method, would take many times as long to accomplish and would be far more prone to human error. By keeping the respective weave pattern matrices geometrically separated from each other during the formation of the block diagonal matrix, it is easier for the operator to visualize his work, and since it is the computer rather than the operator which assembles the diagonal matrix and interleave the rows and columns of the various layer matrices, the operator is relieved of that responsibility. Extension or adaptation of this technique to other weave designing problems is contemplated. The process of designing woven wire circuitry or optical fiber code translators for example, can be expedited materially by utilizing at least some of the features disclosed herein.

Figure 22:
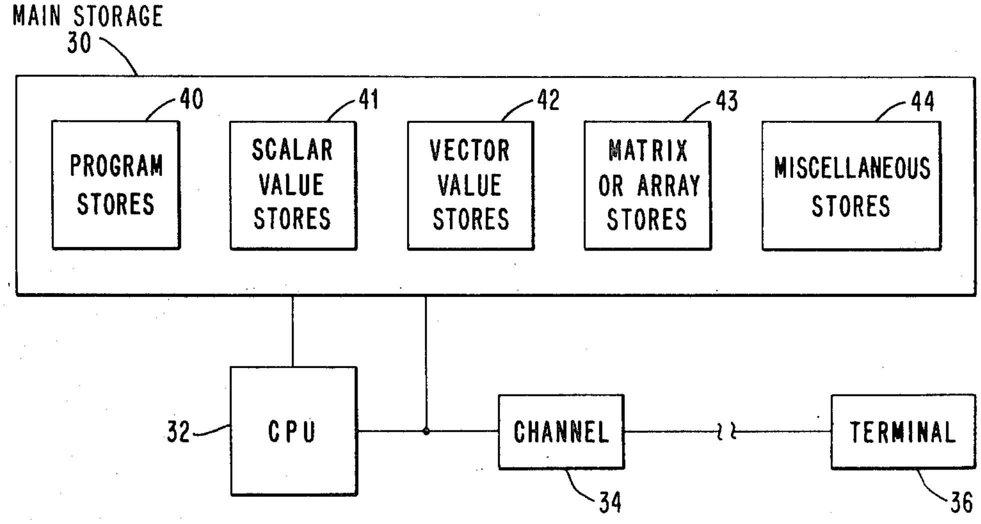
FIG. 22 is a block diagram representing in a general way a data processing system in which the disclosed matrix generating process may be practiced.

Fig. 22 indicates in a very general way how the above-described process may be implemented with a general purpose computer such as an IBM system/360, for example. The main storage facility 30 of the computer communicates with a central processing until (CPU) 32 and, through channel 34, with a terminal 36 that may be, for example, an APL terminal (IBM Type 2741 or equivalent). The CPU 32 likewise communicates via the channel 34 with the terminal 36. Several terminals such as 36 may use the same central data processing facilities on a time-sharing basis. The program embodying the process is stored in a portion 40 of the main storage unit 30 allocated to that purpose, and under the control of this program, other portions such as 41 to 44 of the storage unit 30 are utilized for storing the various scalar values, vector values, arrays and matrices that may be entered into storage via the terminal unit 36 or be generated by the CPU 32, as well as for other miscellaneous storage junctions.

For convenience of description, the work "row" has been used herein to describe a line running parallel with the direction of the weft threads, and the work "column" has been used to describe a line running parallel with the direction of the warp threads in the fabric that is to be woven from the design matrix. Insofar as the matrix itself is concerned, however, the terms "row" and "column" merely refer to rectangular coordinates and could be replaced by other suitable coordinate designations if desired. Similarly, terms such as "left, " "right," "top," and "bottom" are used merely for convenience herein and are not intended to denote geometric limitations. The term "fabric" is used herein to denote any type of woven structure, not merely a textile or woven cloth. The word "thread" may be applied generically to any filamentary member or strand that is capable of being woven. "1" and "0" bit values, as used herein to distinguish different types of thread crossings. obviously have interchangeable meanings.

Thus, while the invention has been particularly shown and described with reference to a preferred embodiment thereof, it will be understood by those skilled in the art that changes in form and details may be made therein without departing from the spirit and scope of the invention.

What is claimed is:

1. A method of utilizing a computer having binary data storage means to determine the manner in which a loom is to be operated for weaving a multilayer fabric whose respective layer have distinctive weave patterns, said method comprising the steps of:

a. operating said computer to form in said data storage means a block diagonal type of matrix whose bits represent warp and weft thread crossings, said step (a) including the following subsidiary steps:

a1. storing submatrices of bits respectively representing said layer weave patterns as blocks in nonoverlapping, diagonally adjacent relationship along a given diagonal of said matrix;

a2. storing bits of a certain value (e.g., 1) in the bit storage positions that are located within the said matrix on one side of the diagonally arranged blocks therein; and a3. storing bits of another binary value (e.g., 0) in the bit storage positions that are located within said matrix on the other side of the diagonally arranged blocks therein; and b. operating said computer to rearranged the stored bit representations of said block diagonal matrix in accordance with an interleaving process whereby coordinate alignments of stored bits extending through the respective submatrices are interleaved with each other to provide a final matrix of stored bits representing various thread actuating instructions that may be furnished to a loom for weaving a multilayer fabric wherein said weave patterns are positioned in different layers of the fabric and in manually overlapped relationship.

2. A method as set forth in claim 1 wherein said step (a) includes the following additional subsidiary step:

a4. altering the value of any of the bits that were stored in said block diagonal matrix during the performance of steps (a2) and (a3) in order to represent the interlacing of selected layers at a selected point or points.

3. A method of utilizing a computer having digital data storage means and data manifesting means to form an array of bits representing the manner in which warp and weft threads are to be manipulated by a loom in order to weave a multilayer fabric having desired weave patterns in its respective layers, each of the bits which have a predetermined value (e.g., 1) representing the crossing of a warp thread over a weft thread in the fabric to be woven, and each of the bits which have the opposite valve (e.g., 0) representing the crossing of a weft thread over a warp thread in said fabric, said method comprising the steps of:

a. entering into said computer data which determines the placement of the weave pattern bits for each layer of said fabric with reference to the rows and columns of a binary matrix to be formed in said data storage means;

b. operating said computer to enter into those bit storing positions which are defined by the rows and columns allocated to each layer the bits that will represent the weave pattern for that layer;

c. operating said computer to store a bit having said predetermined value (e.g., 1) in each bit storing position of said storage means which is defined by the intersection of a column allocated to any of the upper layers with a row allocated to any of the lower layers in said fabric;

d. operating said computer to store a bit of said opposite value (e.g. 0) in each bit storing position of said storage means which is defined by the intersection of a row allocated to any of the upper layers with a column allocated to any of the lower layers in said fabric; and e. operating said data storage means and said data manifesting means in response to the performance of said preceding steps for manifesting a final array of bits representing the warp and weft thread crossings which are to be formed by the loom for weaving the desired multilayer fabric.

4. A method as set forth in claim 3 wherein said step (e) includes the following subsidiary steps:

e1. operating said data storage means to interleave the rows of bits extending through each of said layer weave patterns with the rows of bits extending through each of the other layer weave patterns; and e2. operating said data storage means to interleave the columns of bits extending through each of said layer weave patterns with the columns of bits extending through each of the other layer weave patterns.

5. A method as set forth in claim 4 wherein said step (e) further includes the following subsidiary step:

e3. altering the value of the bit stored at the intersection of any selected row extending through one layer weave pattern with any selected column extending through another layer weave pattern to denote an interlacing between the respective layers in the final array. 43

6. A method of utilizing a computer having binary data storage means to form an array of bits indicating the manner in which a loom should be operated for weaving a multilayer fabric wherein two adjacent layers of said fabric have weave patterns W1 and W2, respectively, each such pattern being repeated throughout the weave of its layer and being capable of representation by a rectangular array of bits, wherein the 1 and 0 values of said bits respectively represent opposite types of weft and warp thread crossings; the array for weave pattern W1 having M1 rows and N1 columns; the array for weave pattern W2 having M2 rows and N2 columns; each of the rows in said arrays corresponding to the position of a weft thread in said fabric, and each of the columns in said arrays corresponding to the position of a warp thread in said fabric; said method comprising the steps of:

a. operating said computer to form in said data storage means a stored representation of a rectangular binary matrix containing a set of adjacent rows equal in number to M1 together with another set of adjacent rows equal to M2, and containing a set of adjacent columns equal in number to N1 together with said another set of adjacent columns equal in number to N2, said step (a) including the following subsidiary steps;

a1. storing in the positions of said matrix defined by said set of M1 rows and said set of N1 columns the bits of weave pattern W1;

a2. storing in the positions of said matrix defined by said set of M2 rows and said set of N2 columns the bits of weave pattern W2;

a3. storing in substantially all of the positions of said matrix defined by said set of M1 rows and said set of N2 columns bits having a selected one of the binary values (e.g., 0);

a4. storing in substantially all of the positions of said matrix defined by said set of M2 rows and said set of N1 columns bits having the other of the binary values (e.g., 1); said 0 and 1 bits located in the respective positions specified by steps (a3) and (a4) above denoting that the weave patterns W1 and W2 respectively are positioned in different layers of the fabric;

b. operating said computer to transpose certain of the rows of said matrix, without thereby altering the contents of any such row, so that at least some of the rows containing bits of one weave pattern are interleaved with rows containing bits of another weave pattern in said matrix;

c. operating said computer to transpose certain of the columns of said matrix, without thereby altering the contents of any such column, so that at least some of the columns containing bits of one weave pattern are interleaved with columns containing bits of another weave pattern in said matrix; and d. operating said computer in accordance with the final arrangement of stored bits in the M1 and M2 rows and the N1 and N2 columns of said matrix, after the transpositions thereof recited in steps (b) and (c) have been effected, to manifest, at least in representative form, the various thread actuating instructions which a loom must be furnished in order to weave a multilayer fabric wherein said weave patterns W1 and W2 are in different layers of the fabric and occupy mutually overlapped positions.

7. A method as set forth in claim 6 wherein said step (a) includes the following additional subsidiary step:

a5. altering the value of any selected bit that was stored in said matrix during steps (a3) and (a4) in order to define an interconnection point between said two layers.

8. A method of utilizing a computer having data storage means and data entering means to determine the manner in which warp threads and weft threads are to be manipulated by a loom for weaving a multilayer fabric wherein each layer has a selected weave pattern that is capable of representation by a rectangular bit matrix in which each "1" represents a warp-over-weft thread crossing and each "0" represents a weft-over-warp thread crossing, said method comprising the following steps:

a. operating said data entering means to store in said data storage means a plurality of rectangular bit matrices each identified as one of said layer matrices, said layer matrices being numbered for reference according to the relative order of their respective layers commencing with the topmost layer of the fabric;

b. operating said computer to rearrange said stored layer matrices in a block diagonal matrix wherein said layer matrices are positioned successively in the order of their respective layer numbers and in diagonally adjacent relationship along one diagonal of said matrix, said step (b) including the following subsidiary steps:

b1. determining the row size value of said block diagonal matrix from the sum of the row sizes of said layer matrices;

b2. determining the column size value of said block diagonal matrix from the sum of the column sizes of said layer matrices; and b3. entering the respective rows of said stored layer matrices successively into the respective rows of an array contained within said data storage means according to the sequence of layer numbers and row numbers of said layer matrices and in such fashion that each row of said block diagonal matrix is formed by entering into said array a string of "1" bits equal in length to the sum of the row sizes of all preceding layer matrices (if any), followed by a string of bits representing the current row of the current layer matrix, followed by a string of "0" bits equal in length difference (if any), between said column size value and the sum of the column sizes of the current layer matrix and all preceding layer matrices; and c. operating said computer to form in said data storage means a final matrix, derived from said block diagonal matrix, wherein each of a plurality of the rows containing the bits of each layer matrix is positioned adjacent to at least one row containing bits of a different layer matrix, and each layer matrix is positioned adjacent to at least one column containing bits of a different layer matrix; said final matrix representing the overall pattern of warp and weft thread crossings required to form a multilayer weave wherein the weave patterns of the respective layers are in superposed relationship to each other.

9. A method as set forth in claim 8 wherein said step (c) includes the flowing subsidiary steps:

c1. operating said computer to determine from the ratio between the row size of each layer matrix and the smallest of the row sizes of the several layer matrices the permutation of the rows of said block diagonal matrix which would cause the rows of each layer matrix to be interleaved as evenly as possible with the rows of every other layer matrix;

c2. operating said computer to determine from the ratio between the column size of each layer matrix and the smallest of the column sizes of the several layer matrices the permutation of the columns of said block diagonal matrix which would cause the columns of each layer matrix to be interleaved as evenly as possible with the columns of every other layer matrix;

c3. operating said computer to recorder the rows of said block diagonal matrix in accordance with said row interleaving permutation, thereby to form a new matrix; and c4. operating said computer to recorder the columns of said new matrix in accordance with said column interleaving permutation, thereby to form said final matrix.

10. A method as set forth in claim 9 wherein said step (b) includes the following additional subsidiary steps:

b4. operating said data entering means to define in said block diagonal matrix the location of a point where a selected row of one layer matrix is to be interlaced with a selected column of a different layer matrix; and b5. adding a binary 1, by modulo-2-addition, to the bit located at said interlacing point, thereby changing the type of thread crossing specified at that point.

* * * * *

PO-1050
(5/69)

UNITED STATES PATENT OFFICE
CERTIFICATE OF CORRECTION

Patent No. 3,634,827 Dated January 11, 1972

Inventor(s) Janice Richmond Lourie and Lin S. Woo

It is certified that error appears in the above-identified patent and that said Letters Patent are hereby corrected as shown below:

Column 1, line 48, "the" should read --then--. Column 5, line 48, "1" should read --diagrammatically--. Column 6, line 70, "and", second occurrence, should read --are--. Column 7, line 3, "threaded" should read --treated--; line 23 "by" should read --be--; line 26, "MA" should read --M÷A--. Column 8, line 36, insert --A Programming-- before "Language". Column 9, line 12, "55" should read --5--. Column 10, line 22, "a" should read --at--; line 40, "ND" should read --NS--; line 58, "valve" should read --value--; line 71, "interconnection" should read --layer--. Column 11, line 5, "Vapor" should read --vector--; line 8, "requires" should read --inquires--; line 39, "process" should read --proceed--; line 48, "1" should read --the--. Column 12, line 43, "M[L]A" should read --M[L]÷A--. Column 13, line 35, "interfacings" should read --interlacings--; line 55, "036" should read --D36--. Column 14, line 34, "is" should read --a--; line 44, "invent" should read --invert--. Column 15, line 34, "until" should read --unit--; lines 47 and 49, "work", each occurrence, should read --word--. Column 16, line 26, "manually" should read --mutually--; line 42, "valve" should read --value--. Column 17, line 12, delete "43". Column 19, lines 1 and 5, each occurrence, "recorder" should read --reorder--.

Signed and sealed this 27th day of June 1972.

(SEAL)
Attest:

EDWARD M.FLETCHER,JR.
Attesting Officer

ROBERT GOTTSCHALK
Commissioner of Patents